(12) United States Patent
Masugi

(10) Patent No.: US 8,023,198 B2
(45) Date of Patent: Sep. 20, 2011

(54) LENS SYSTEM AND OPTICAL APPARATUS HAVING THIS LENS SYSTEM

(75) Inventor: Saburo Masugi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/422,275

(22) Filed: Apr. 12, 2009

(65) Prior Publication Data

US 2009/0268308 A1    Oct. 29, 2009

(30) Foreign Application Priority Data

Apr. 22, 2008  (JP) .................... 2008-111553

(51) Int. Cl.
*G02B 15/14* (2006.01)
*G02B 13/18* (2006.01)
*G02B 3/02* (2006.01)

(52) U.S. Cl. ......... 359/689; 359/691; 359/717; 359/716

(58) Field of Classification Search .................. 359/689, 359/691, 751, 755, 756, 762
See application file for complete search history.

(56) References Cited

U.S. PATENT DOCUMENTS

| 6,992,835 B2 | 1/2006 | Iwasawa et al. |
| 2006/0262423 A1 | 11/2006 | Kiyotoshi |
| 2009/0034090 A1 | 2/2009 | Eguchi |

FOREIGN PATENT DOCUMENTS

| EP | 1 455 212 A1 | 9/2004 |
| JP | 2005-37727 A | 2/2005 |
| JP | 2009-37091 A | 2/2009 |

*Primary Examiner* — Alicia M Harrington
(74) *Attorney, Agent, or Firm* — Miles & Stockbridge P.C.

(57) ABSTRACT

A lens system includes, in order from an object: a first lens group having negative refractive power; and a second lens group having positive refractive power, the first lens group including, in order from the object, a lens having a negative refractive power, a plastic aspherical lens, and a lens having a positive refractive power, and the following conditional expression $|fp/f1|>4.0$ being satisfied, where fp denotes a focal length of the plastic aspherical lens, and f1 denotes a focal length of the first lens group.

25 Claims, 23 Drawing Sheets

(Example 1)

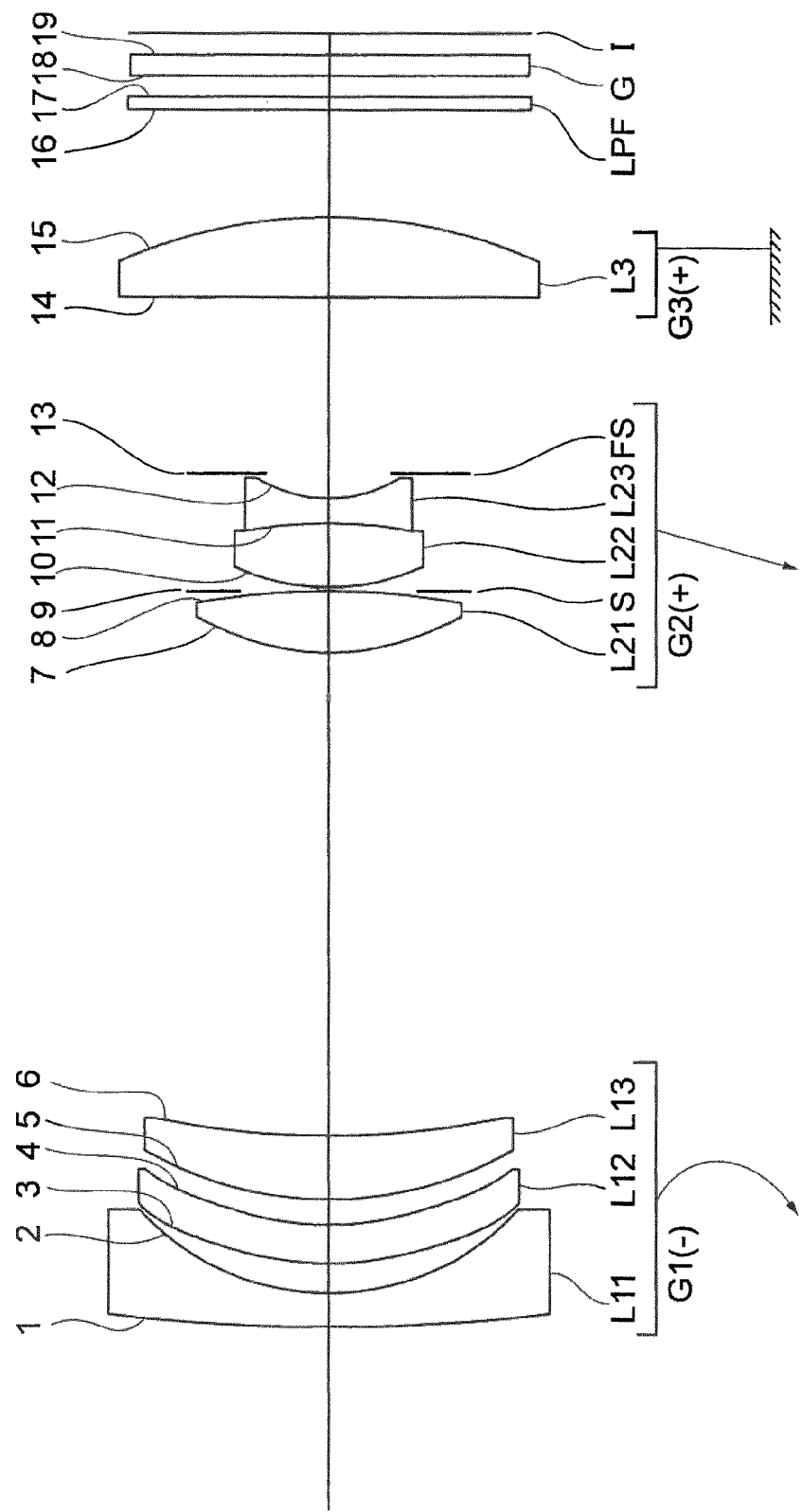

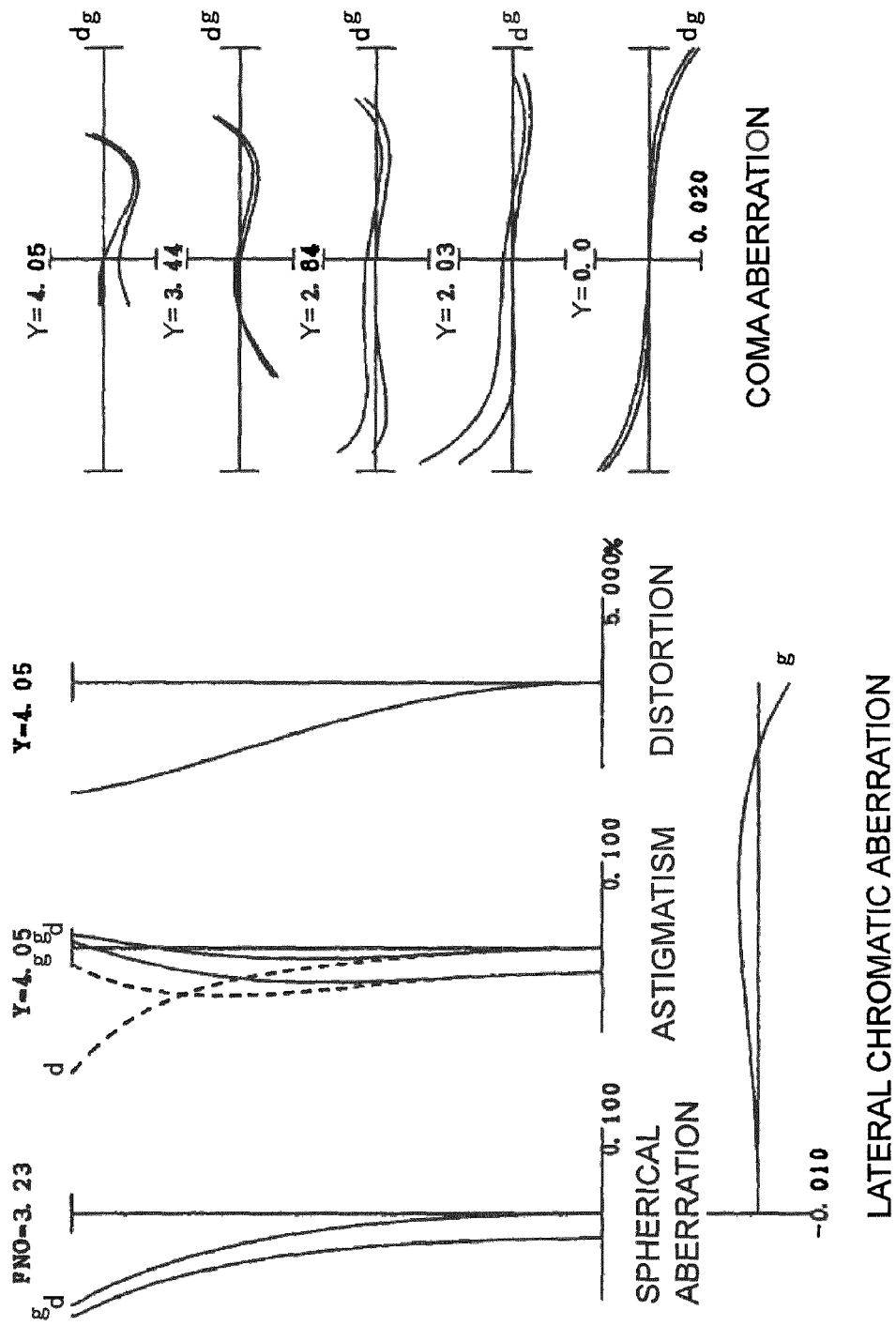

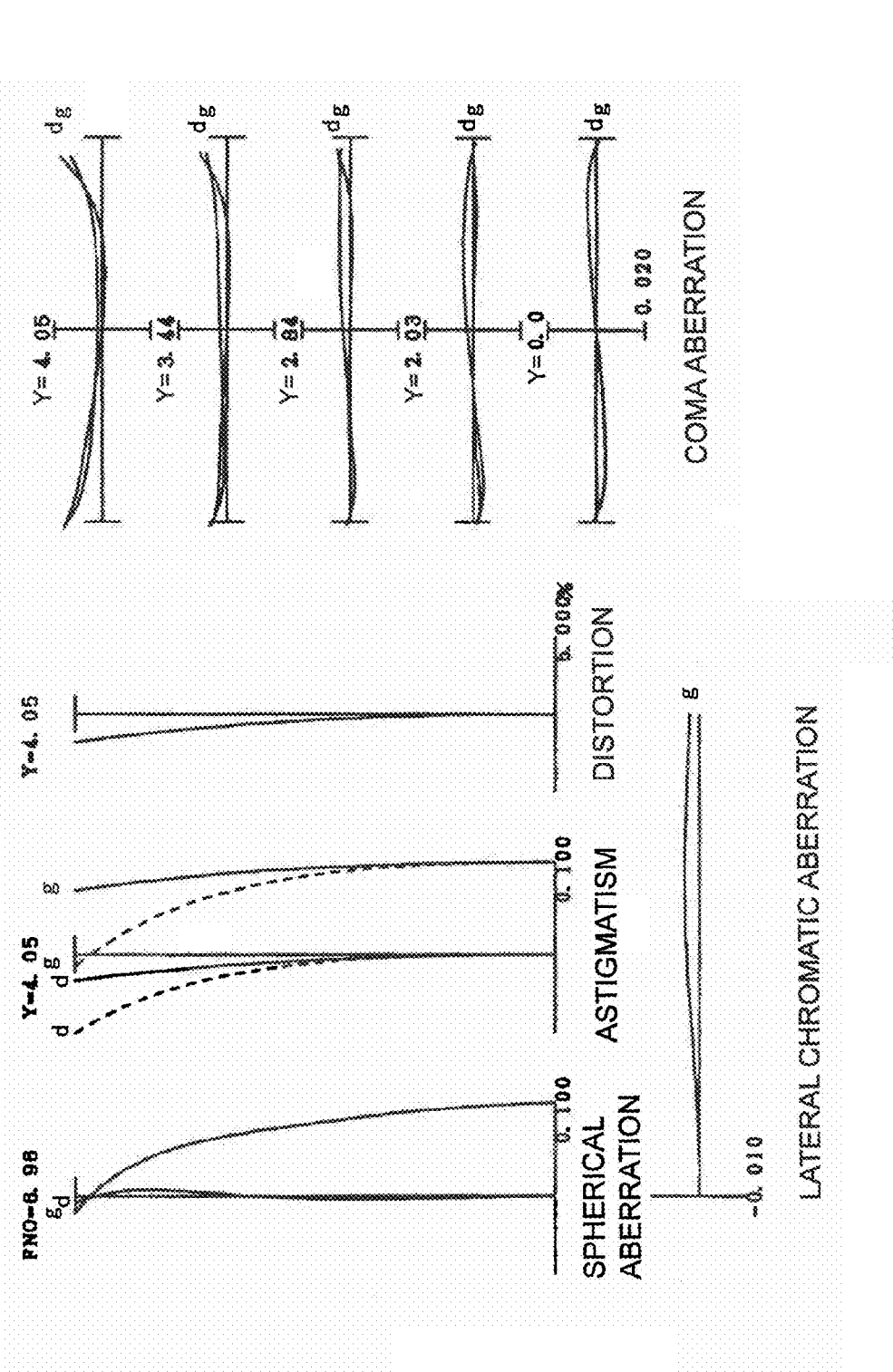

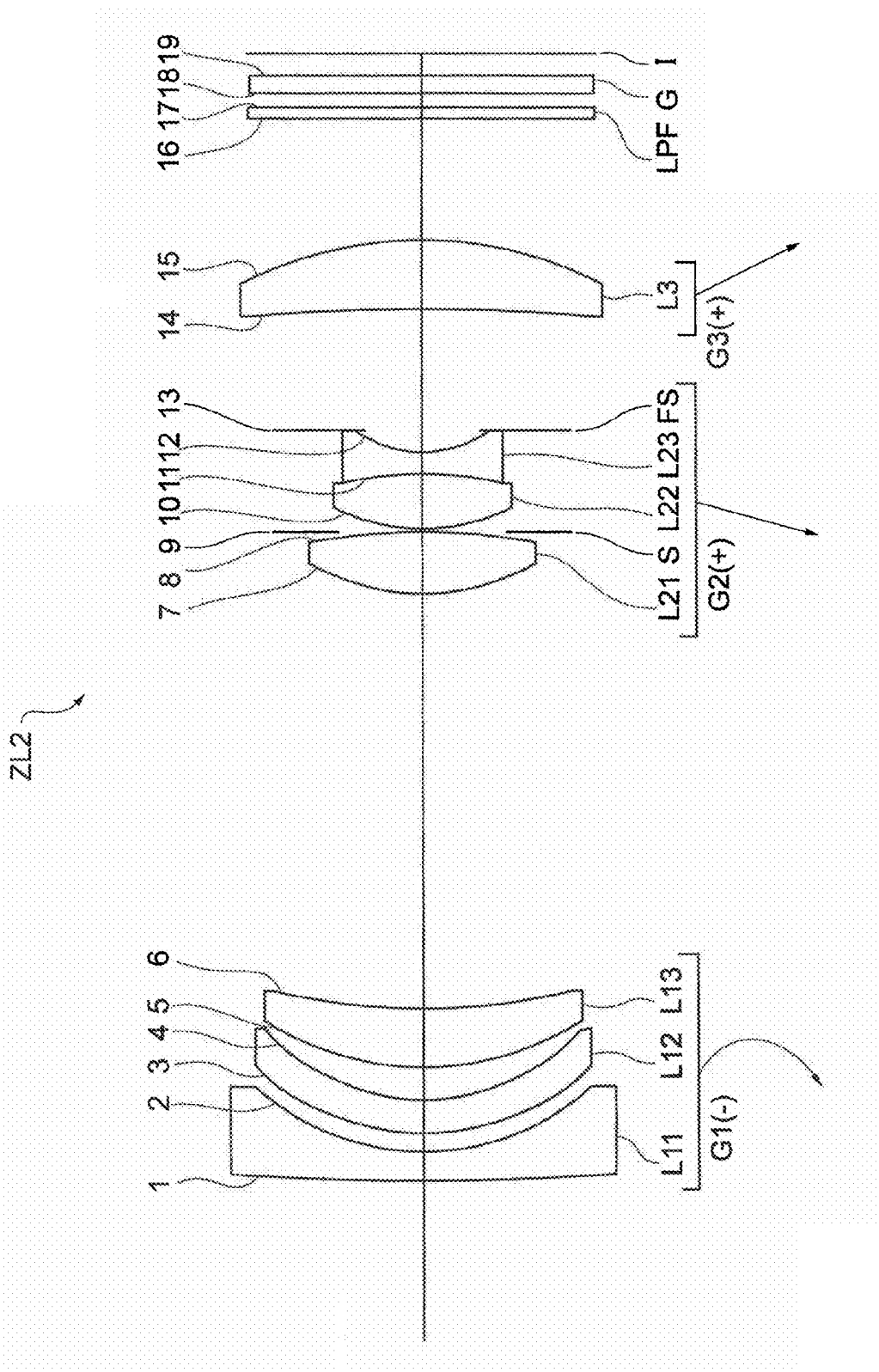

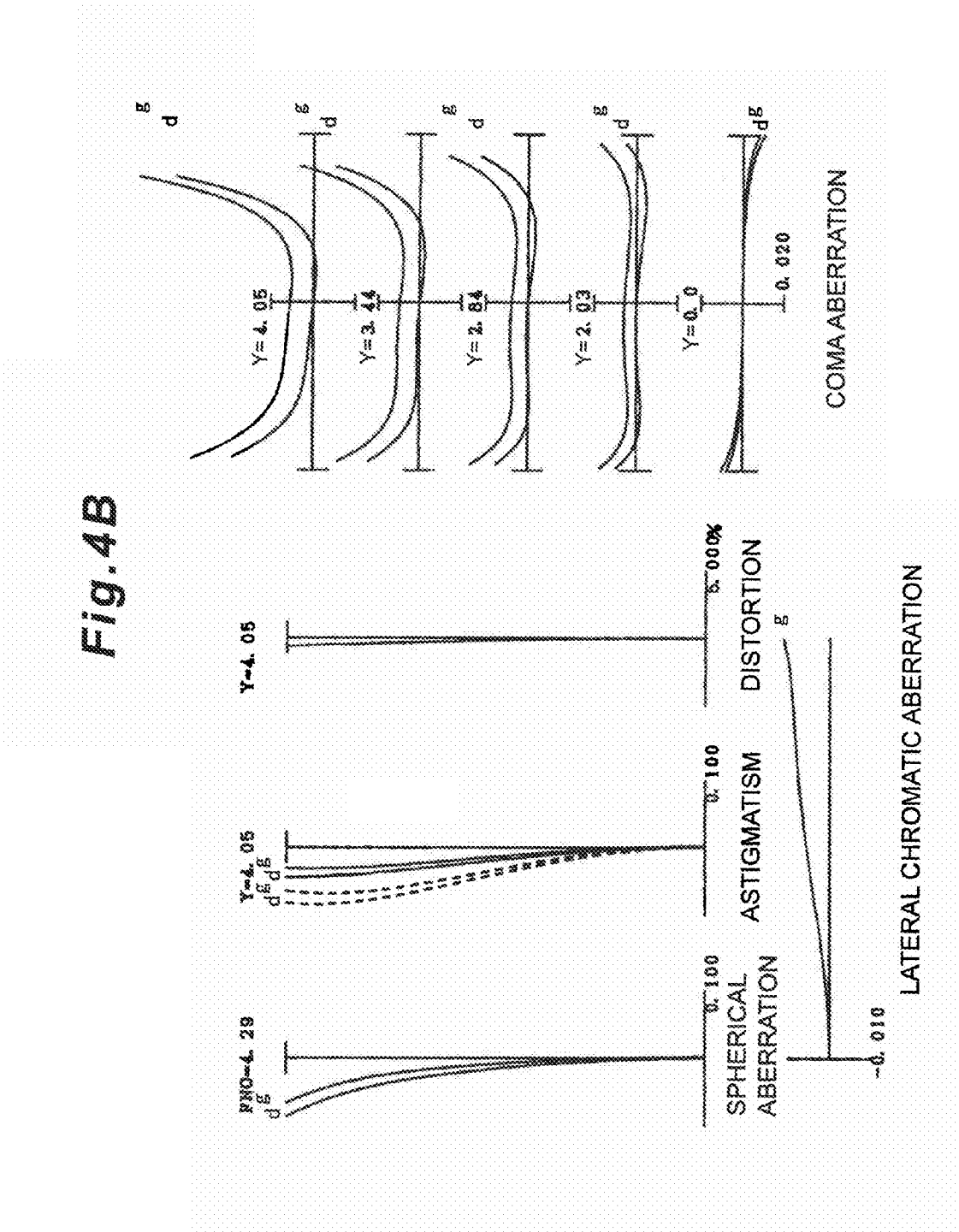

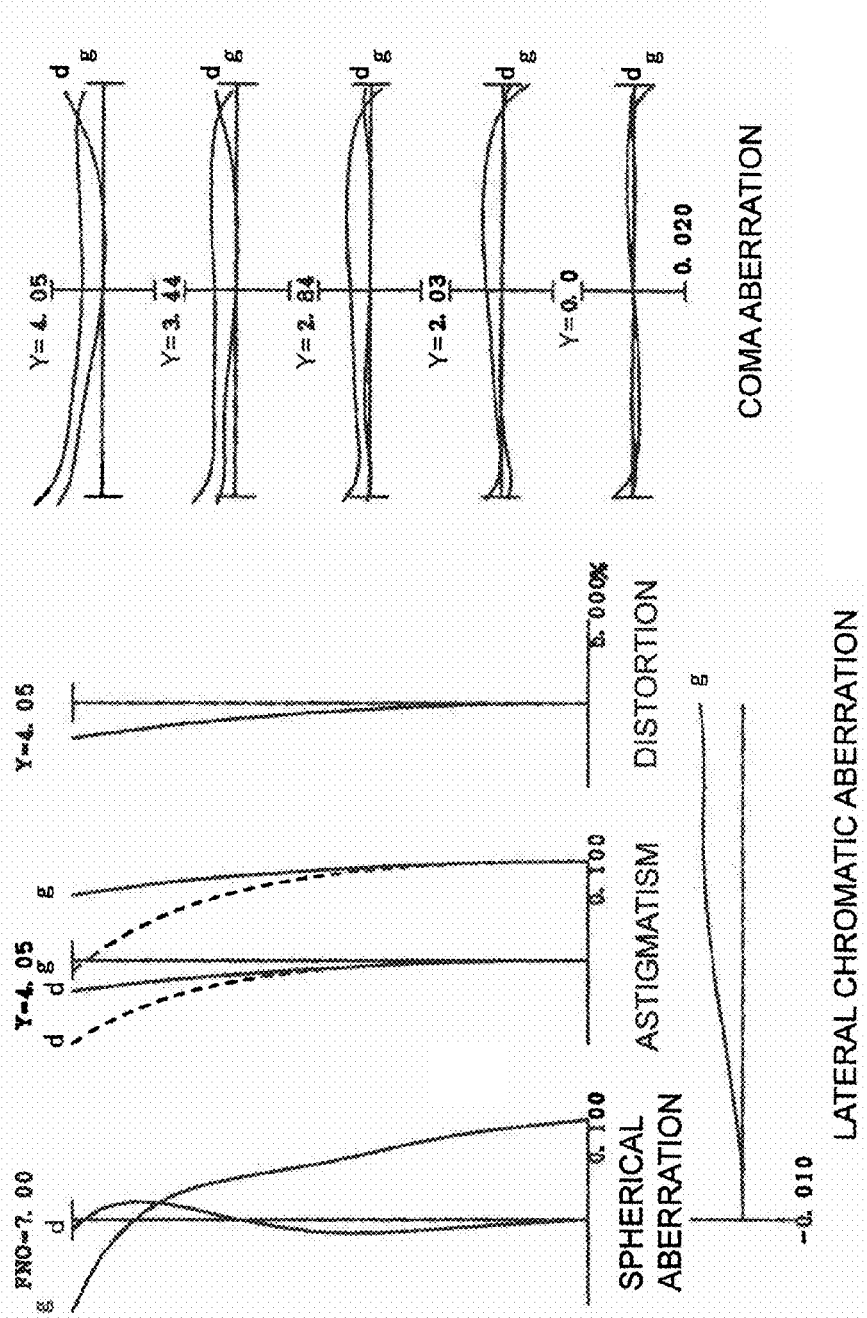

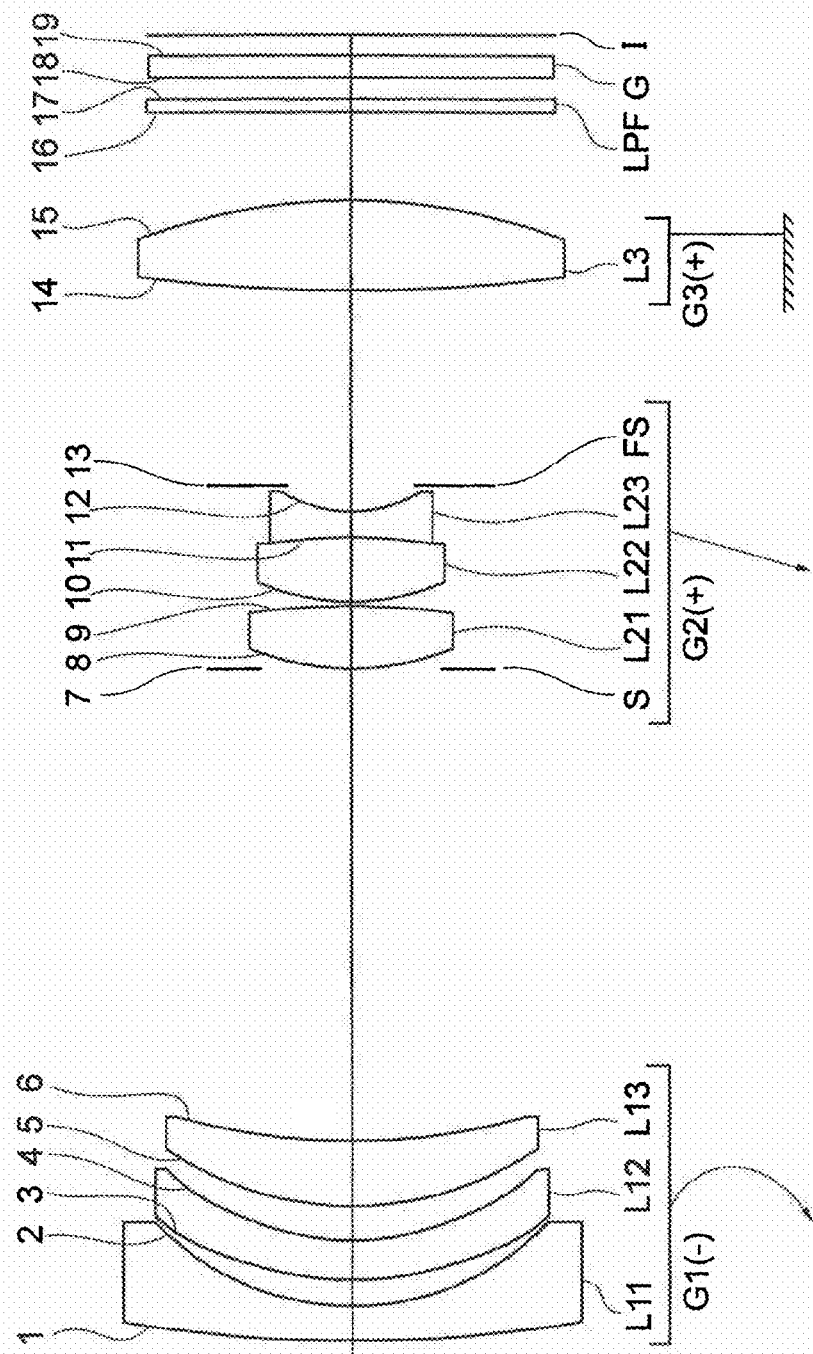

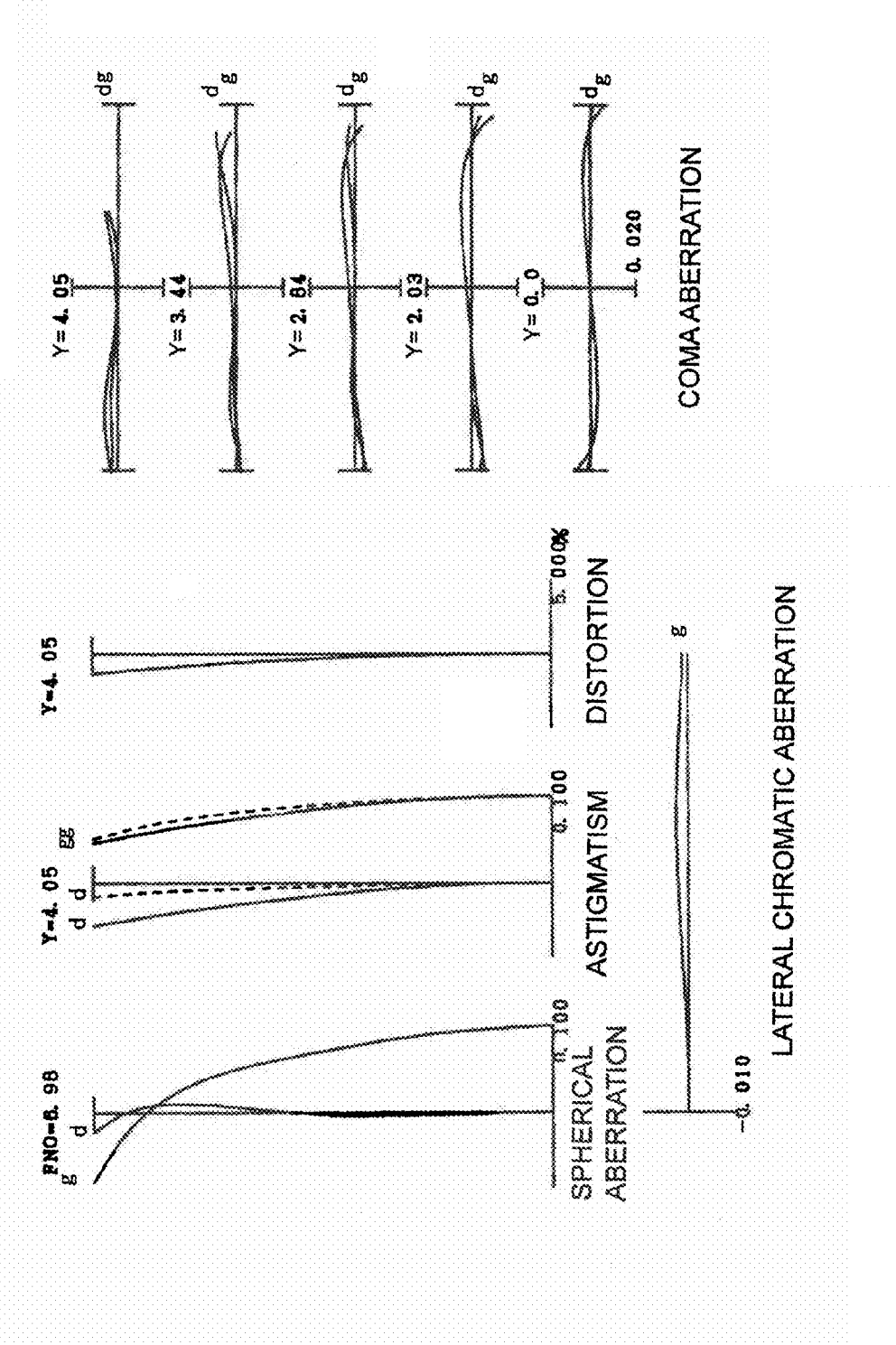

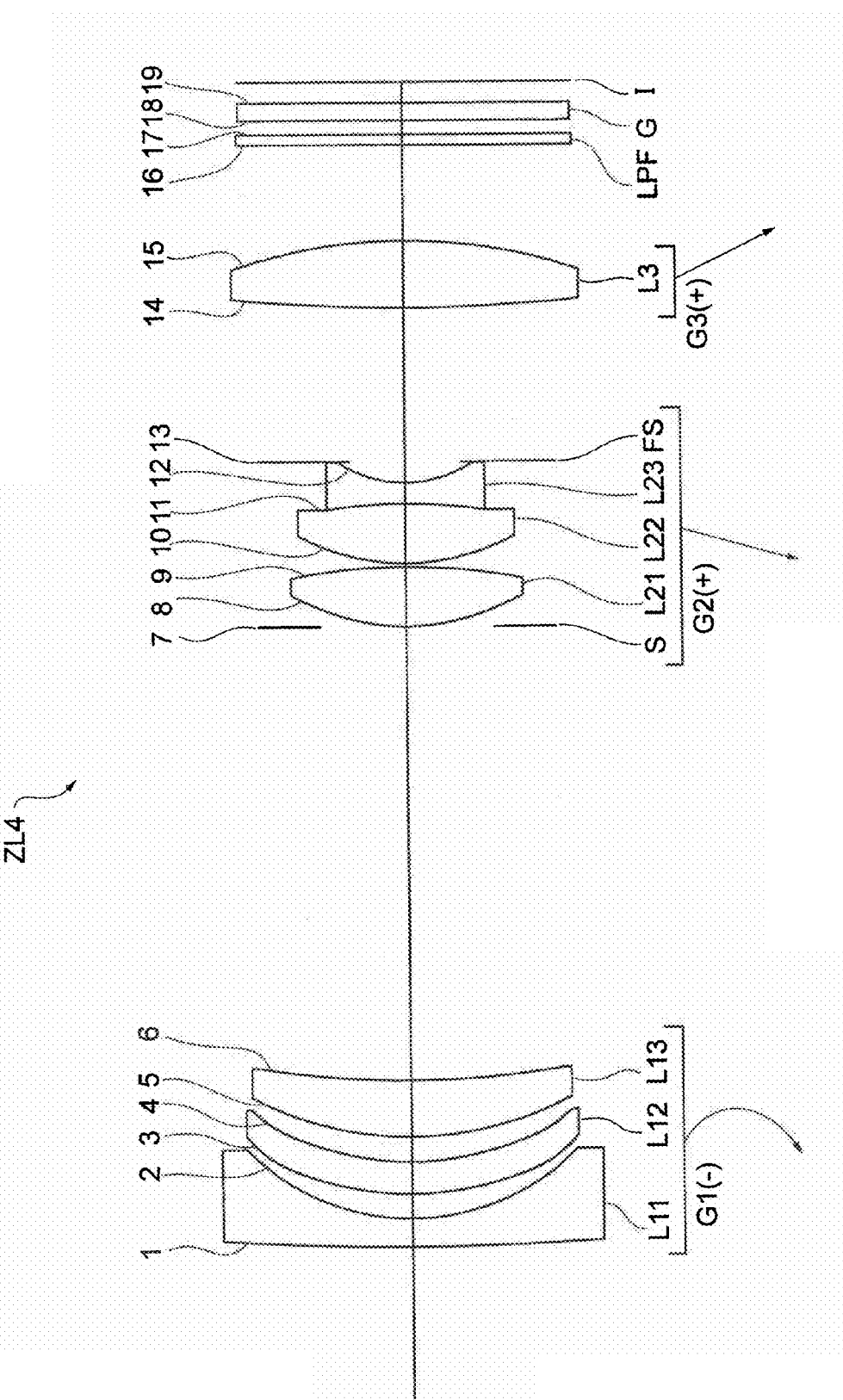
Fig.7 (Example 4)

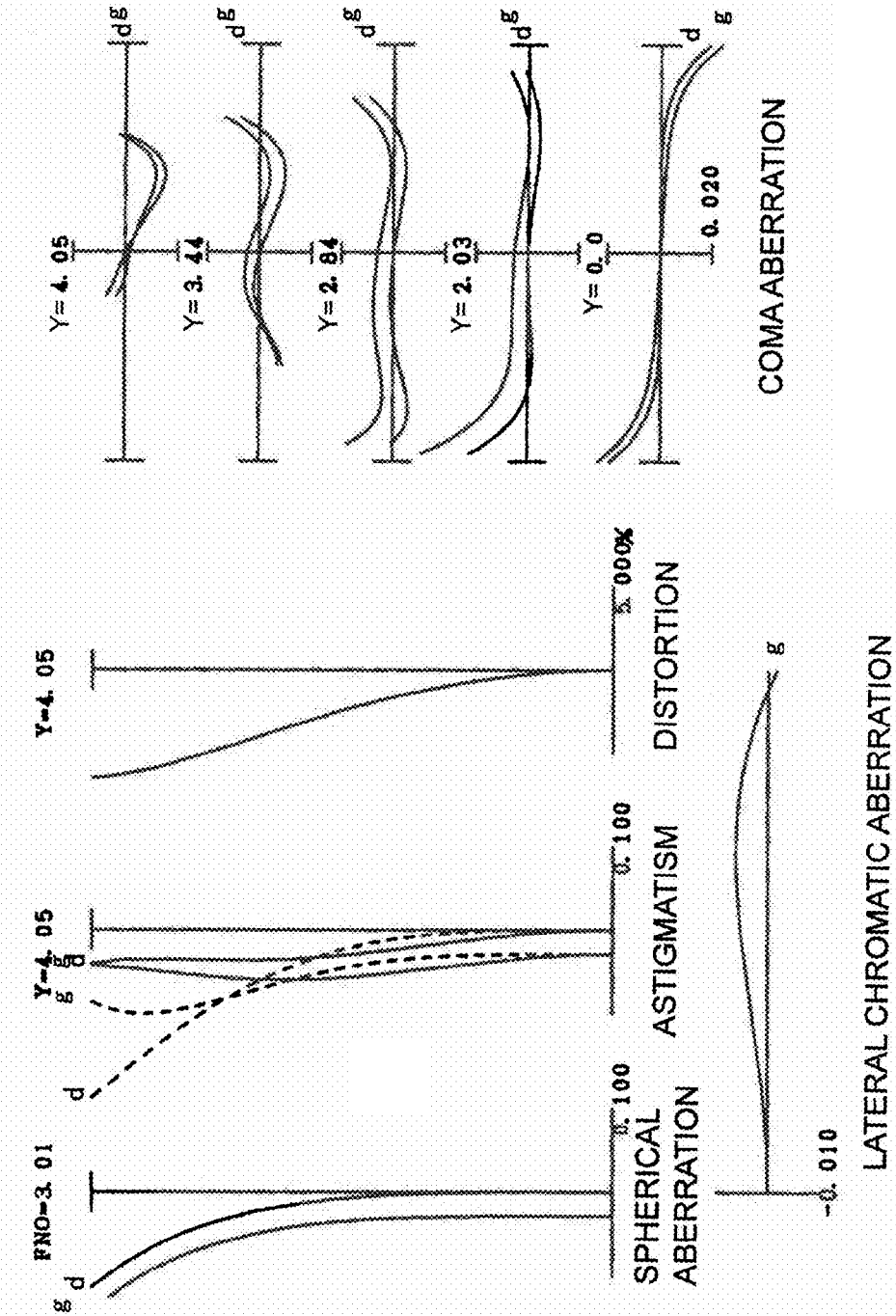

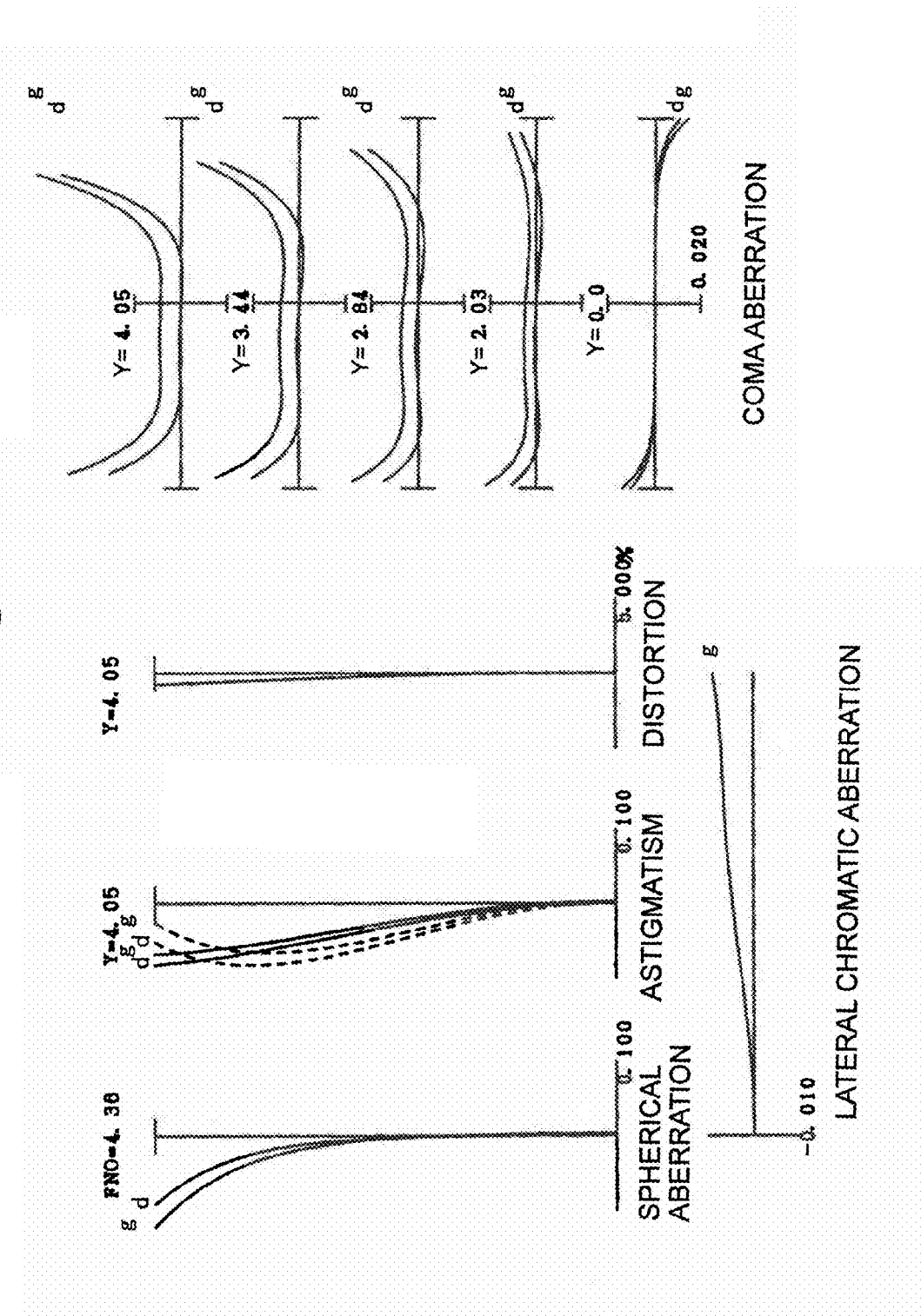

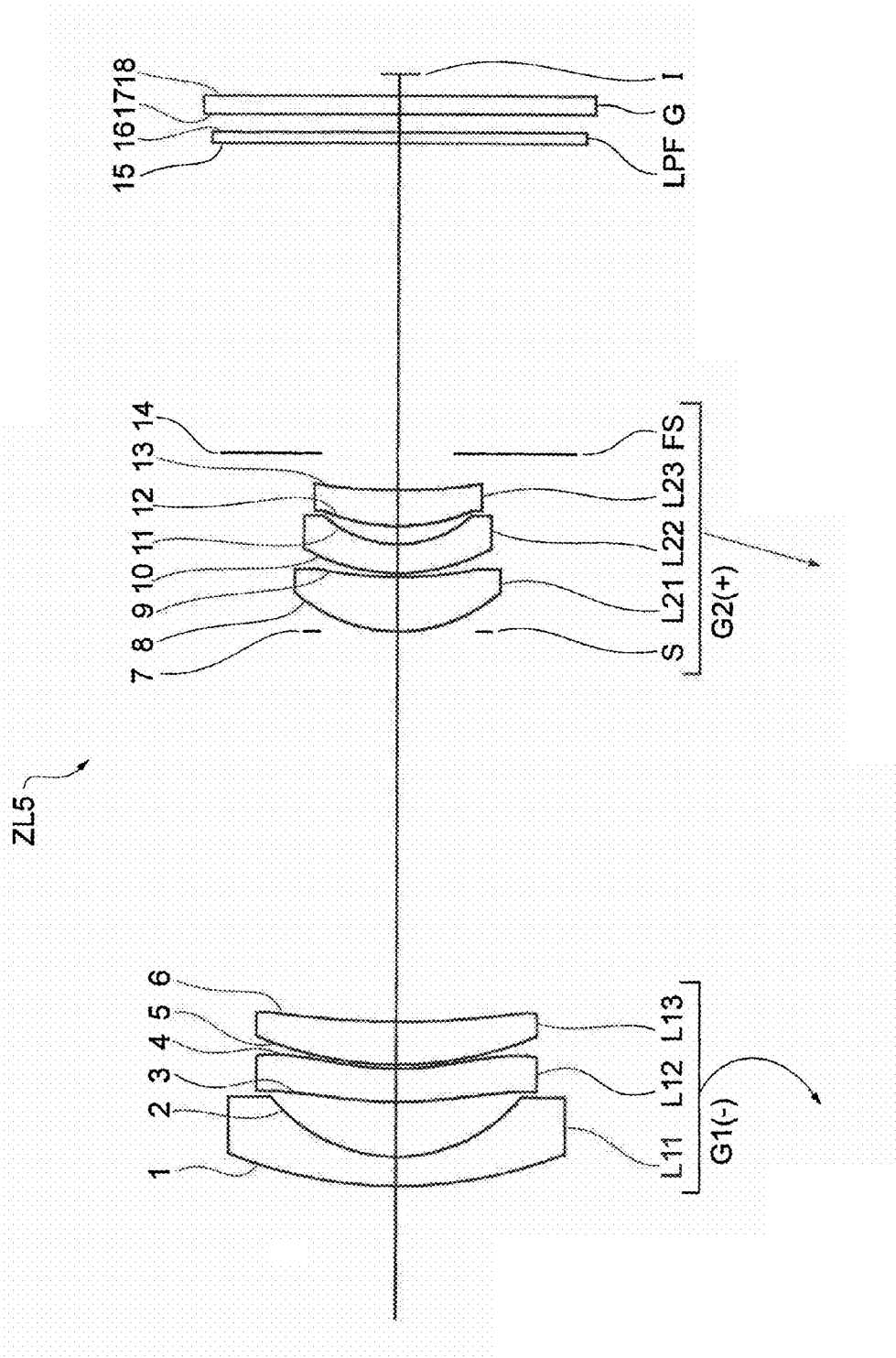

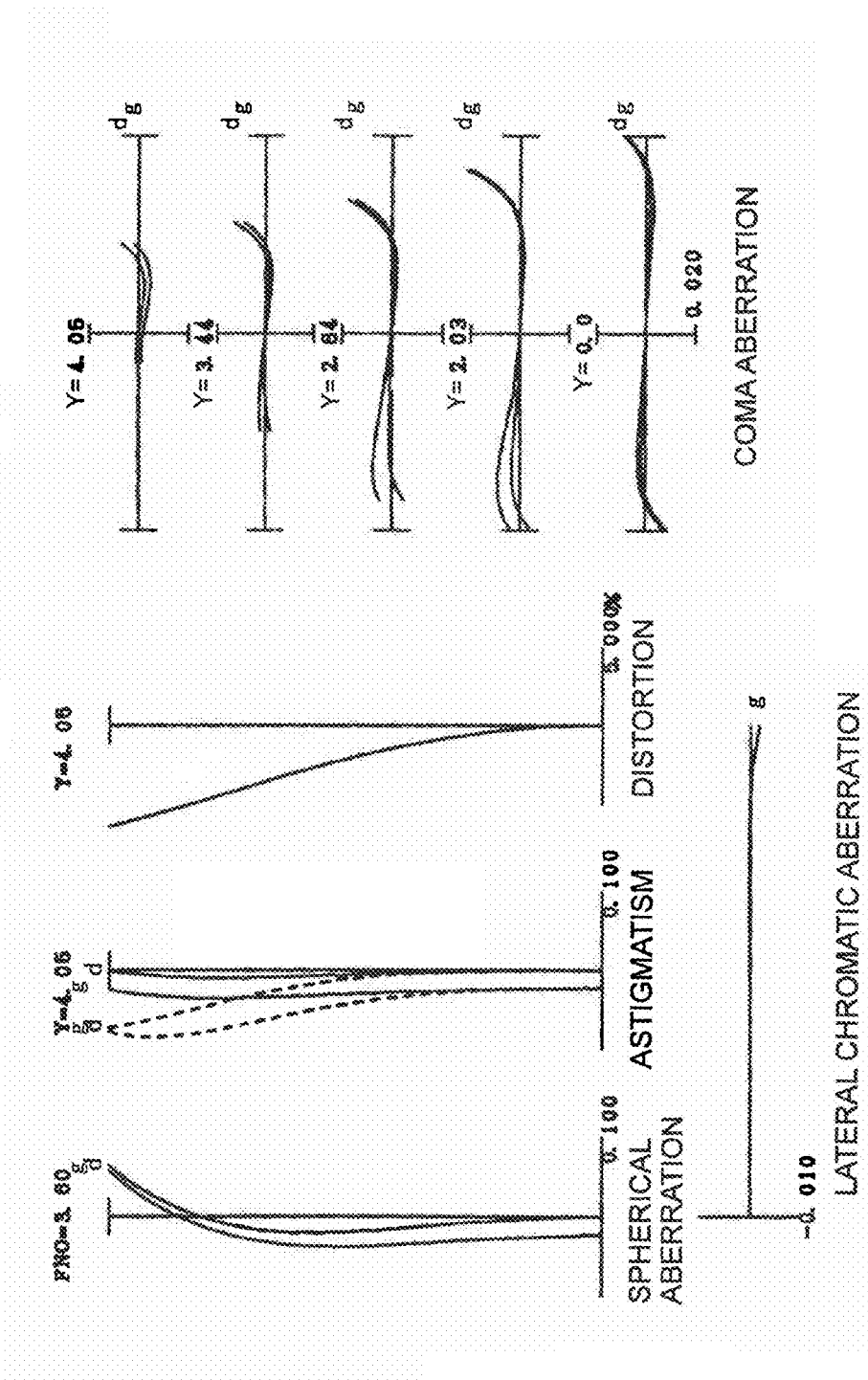

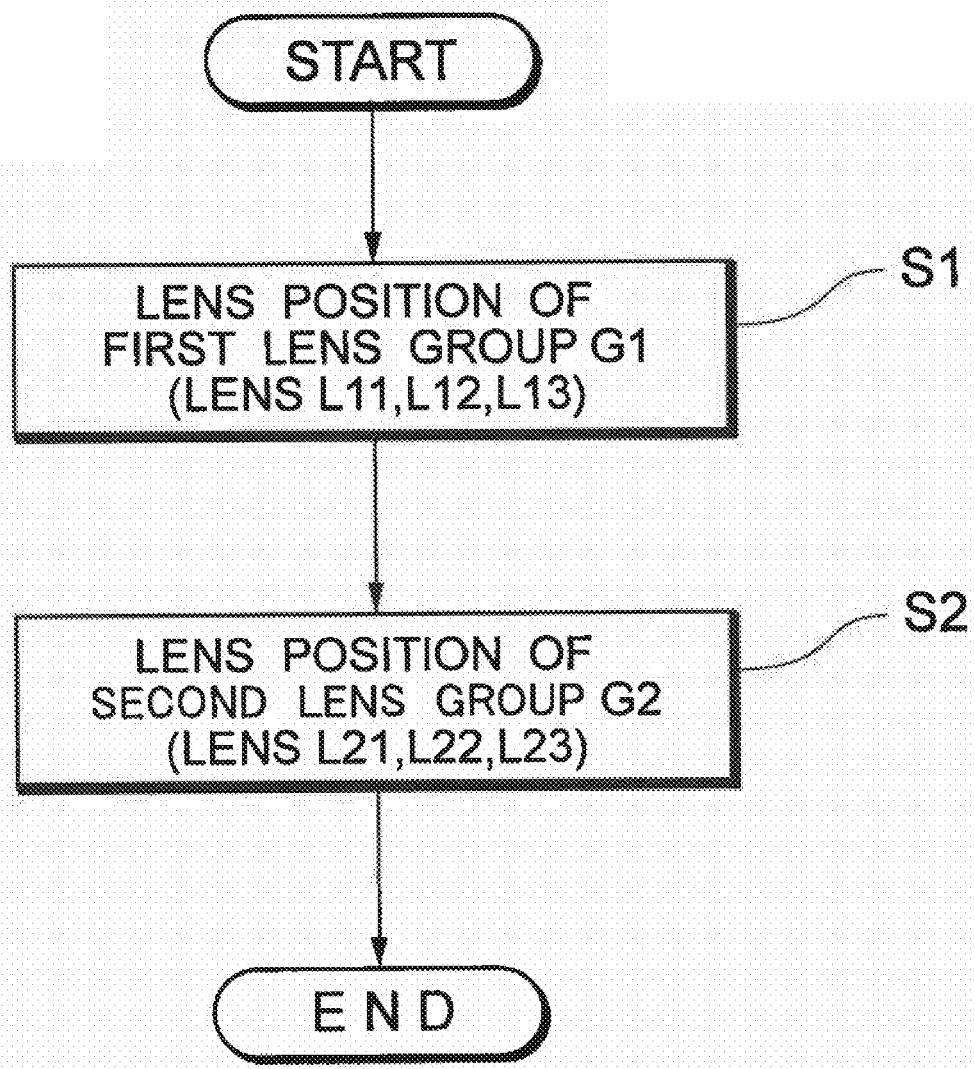

LENS SYSTEM AND OPTICAL APPARATUS HAVING THIS LENS SYSTEM

INCORPORATION BY REFERENCE

This invention claims the benefit of Japanese Patent Application No. 2008-111553 which is hereby incorporated by reference.

FIELD OF THE INTENTION

The present invention relates to a lens system suitable for a camera using a solid image sensing element, such as an electronic still camera and video camera, and an optical apparatus having this lens system.

BACKGROUND OF THE INVENTION

Recently the importance of portability of a digital camera is increasing, and attempts to decrease the size and weight of a lens system, which is installed in the camera, is progressing in order to decrease the size, thickness and weight of the camera unit. For example, a zoom lens comprised of a first lens group having negative refractive power, a second lens group having positive refractive power, and a third lens group having positive refractive power which are disposed in order from an object, where a plastic aspherical lens is disposed in the first lens group, has been disclosed (e.g. see Japanese Patent Application Laid-Open No. 2005-37727).

PROBLEMS TO BE SOLVED BY THE INVENTION

However, in the case of the lens system according to Japanese Patent Application Laid-Open No. 2005-37727, the refractive power of the plastic aspherical lens disposed in the first lens group is so strong that the characteristic of the plastic, that is the change of refractive index by the change of external temperature, is exhibited more clearly. Therefore a drop in performance when the temperature changes cannot be ignored.

SUMMARY OF THE INVENTION

With the foregoing in view, it is an object of the present invention to provide a compact and high performance lens system which excels in temperature characteristics, and an optical apparatus having this lens system.

To achieve this object a lens system of the present invention has, in order from an object, a first lens group having negative refractive power, and a second lens group having positive refractive power, and the first lens group includes, in order from the object, a lens having negative refractive power, a plastic aspherical lens, and a lens having positive refractive power, and the conditional expression, $|fp/f1|>4.0$ is satisfied, where fp denotes a focal length of the plastic aspherical lens, and f1 denotes a focal length of the first lens group.

It is preferable that a third lens having positive refractive power is disposed in the image side of the second lens group.

It is preferable that the conditional expression $-0.65<f1/ft<-0.50$ is satisfied, where f1 denotes a focal length of the first lens group, and ft is a focal length of the lens system in the telephoto end state.

It is preferable that the conditional expression $f2/ft<0.45$ is satisfied, where f2 denotes a focal length of the second lens group, and ft denotes a focal length of the lens system in the telephone end state.

It is preferable that the plastic aspherical lens of the first lens group is a double aspherical lens.

It is preferable that the plastic aspherical lens of the first lens group satisfies the conditional expression $p2>4.5$, where p2 denotes a form factor (the form factor p2 is defined by $p2=|(r2+r1)/(r2-r1)|$, where r1 denotes a radius of curvature of the plastic aspherical lens on the object side lens surface on the optical axis, and r2 denotes a radius of curvature of the plastic aspherical lens on the image side lens surface on the optical axis).

It is preferable that the lenses constituting the third lens group are plastic lenses.

It is preferable that the lenses constituting the third lens group are aspherical lenses.

It is preferable that the conditional expression $\beta3<0.85$ is satisfied, where $\beta3$ denotes a magnification of the third lens group in the wide angle end state.

It is preferable that focusing is performed by moving the third lens group in the optical axis direction.

It is preferable that the second lens group has a positive lens disposed closest to the object side, and satisfies the conditional expression $53<vd2$, where vd2 denotes an Abbe number of the positive lens.

It is preferable that the lens having negative refractive power of the first lens group is a spherical lens.

It is preferable that the lens having a negative refractive power of the first lens group is a glass lens.

An optical apparatus of the present invention has the lens system which has the above mentioned configuration.

ADVANTAGEOUS EFFECTS OF THE INVENTION

According to the present invention, a compact and high performance lens system which excels in temperature characteristics, and an optical apparatus having this lens system, can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1 is a diagram depicting a configuration and zoom locus of a lens system according to Example 1;

FIG. 3 is a diagram depicting a configuration and zoom locus of a lens system according to Example 2;

FIG. 5 is a diagram depicting a configuration and zoom locus of a lens system according to Example 3;

FIG. 7 is a diagram depicting a configuration and zoom locus of a lens system according to Example 4;

FIG. 9 is a diagram depicting a configuration and zoom locus of a lens system according to Example 5;

FIG. 11 shows a digital still camera having the lens system according to the present embodiment, where

FIG. 13 is a flow chart depicting a manufacturing method for the lens system according to the present embodiment.

DESCRIPTION OF THE PREFERRED EMBODIMENTS

Figure 2B:
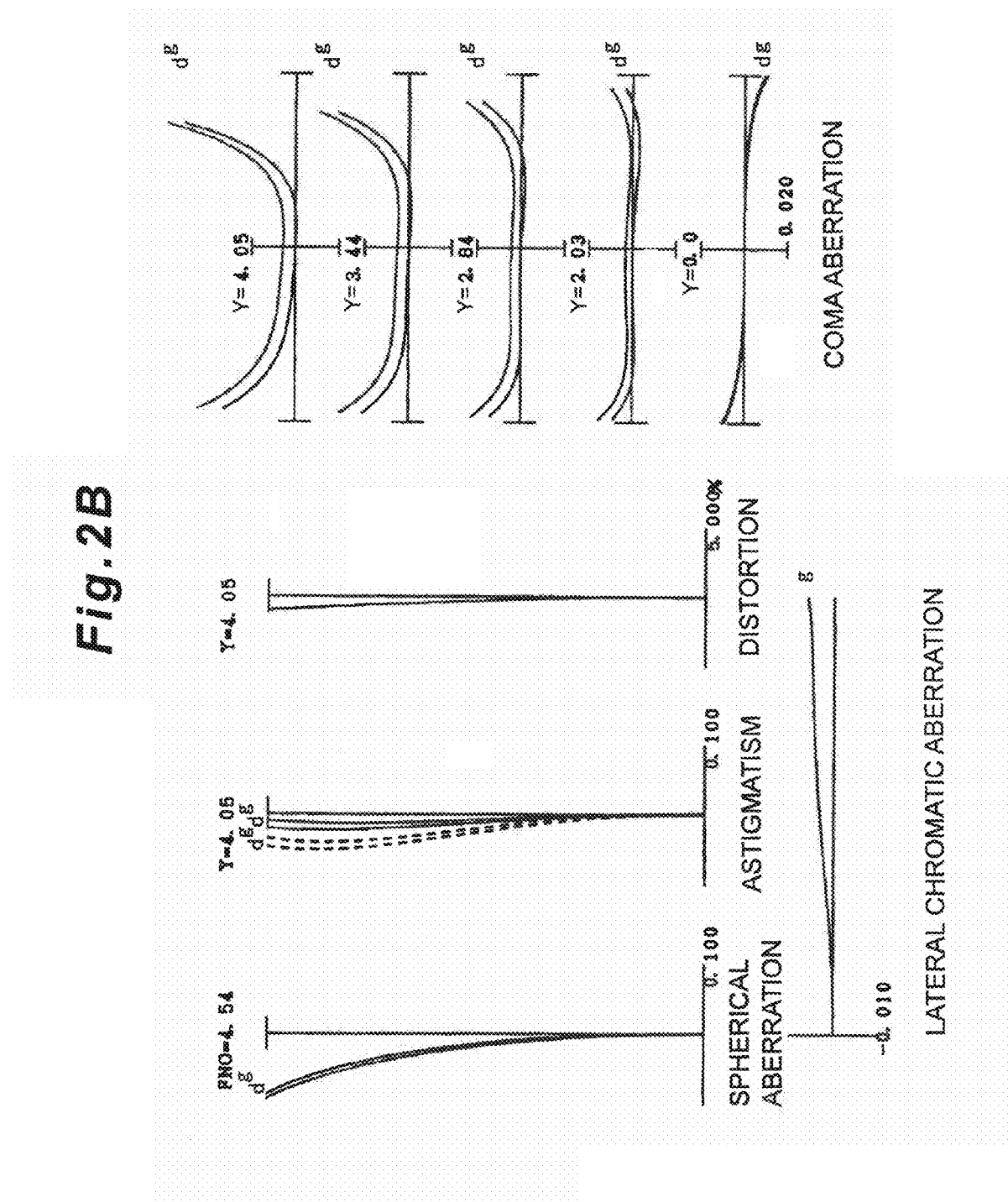
FIG. 2 are graphs showing various aberrations of the lens system according to Example 1, where FIG. 2A are graphs showing various aberrations upon focusing on infinity in the wide angle end state, FIG. 2B are graphs showing various aberrations upon focusing on infinity in the intermediate focal length state, and FIG. 2C are graphs showing various aberrations upon focusing on infinity in the telephone end state.

Embodiments of the present invention will now be described with reference to the drawings. As FIG. 1 shows, a lens system ZL according to the present embodiment is a zoom lens comprising, in order from an object, a first lens group G1 having negative refractive power and a second lens group G2 having positive refractive power, and the first lens group G1 includes, in order from the object, a lens L11 having negative refractive power, a plastic aspherical lens L12 having weak refractive power, and a lens L13 having positive refractive power.

Here the plastic lens is formed by such molding as injection molding, so fabrication of the aspherical surface is not so difficult as a spherical surface, and cost increases little. Therefore according to the present embodiment, manufacturing cost is kept down by using a plastic lens L12 having an aspherical surface, compared with the case of using a glass mold aspherical lens. Also the plastic lens L12 is disposed at a position which is not closest to the object, so as to limit the influence of a temperature change, thereby out of focus caused by the influence of a refractive index change of the plastic material can be minimized.

According to the present embodiment, the following conditional expression (1) is satisfied under the above configuration, $$|fp/f1|>4.0 \quad (1)$$

where fp denotes a focal length of the plastic aspherical lens L12, and f1 denotes a focal length of the first lens group G1.

The conditional expression (1) specifies a ratio of the refractive power of the first lens group G1 with respect to the refractive power of the plastic aspherical lens L12 disposed in the first lens group G1. By satisfying this conditional expression (1), the refractive power of the plastic lens L12 is suppressed, and generated aberrations can be corrected satisfactorily, and the influence of temperature change on the plastic aspherical lens L12 disposed in the first lens group G1 can be decreased. If the lower limit value of the conditional expression (1) is not reached, however, the refractive power of the plastic lens L12 increases, and when the refractive index of the plastic material fluctuates due to the temperature change, the change of back focus amount and the change of such aberrations as astigmatism, due to this fluctuation, cannot be ignored, which is not desirable.

To make the effect of the present embodiment certain, it is preferable to set the upper limit value of the conditional expression (1) to 30.0. Thereby the distortion and astigmatism can be corrected satisfactorily. To make the effect of the present embodiment more certain, it is preferable to set the upper limit value of the conditional expression (1) to 20.0. Thereby the distortion and astigmatism can be corrected more satisfactorily.

To make the effect of the present embodiment certain, it is preferable to set the lower limit value of the conditional expression (1) to 4.6. To make the effect of the present embodiment more certain, it is preferable to set the lower limit value of the conditional expression (1) to 7.0.

According to the present embodiment, it is preferable that a third lens group G3 having positive refractive power is disposed in the image side of the second lens group G2. By this configuration, downsizing and good image forming performance can be implemented.

According to the present embodiment, it is preferable that the following conditional expression (2) is satisfied, $$-0.65<f1/ft<-0.50 \quad (2)$$

where f1 denotes a focal length of the first lens group G1, and ft denotes a focal length of the lens system in the telephoto end state.

The conditional expression (2) specifies a ratio of the focal length f1 of the first lens group G1 with respect to the focal length ft of the lens system in the telephoto end state. If the upper limit value of the conditional expression (2) is exceeded, the moving distance of the second lens group G2 increases, which makes downsizing difficult, and is therefore not desirable. If the lower limit value of the conditional expression (2) is not reached, on the other hand, the distance between the first lens group G1 and the second lens group G2 decreases, which also makes downsizing difficult. If the conditional expression (2) is not satisfied, correction of the lateral chromatic aberration, astigmatism and coma aberration becomes difficult.

To make the effect of the present embodiment certain, it is preferable to set the upper limit value of the conditional expression (2) to −0.52. To make the effect of the present embodiment certain, it is preferable to set the lower limit value of the conditional expression (2) to −0.60.

According to the present embodiment, it is preferable that the following conditional expression (3) is satisfied, $$f2/ft<0.45 \quad (3)$$

where f2 denotes a focal length of the second lens group G2, and ft is a focal length of the lens system in the telephoto end state.

The conditional expression (3) specifies the ratio of the focal length f2 of the second lens group G2 with respect to the focal length ft of the lens system in the telephoto end state. If the upper limit value of the conditional expression (3) is exceeded, the power of the second lens group G2 becomes too low, and the moving distance of the second lens group G2 to be required for zooming increases, and therefore the lens system becomes too large, which is not desirable in terms of downsizing. If the upper limit value of the conditional expression (3) is exceeded, correction of the lateral chromatic aberration, astigmatism and coma aberration becomes difficult.

To make the effect of the present embodiment certain, it is preferable to set the upper limit value of the conditional expression (3) to 0.41.

In the present embodiment, the zooming ratio can be increased to 3 times or more, without increasing the size of the lens system very much, by satisfying the conditional expressions (2) and (3).

According to the present embodiment, it is preferable that the plastic aspherical lens L12 of the first lens group G1 is a double aspherical lens. By this configuration, distortion and astigmatism can be corrected satisfactorily.

According to the present embodiment, it is preferable that the plastic aspherical lens L12 of the first lens group G1 satisfies the following conditional expression (4), $$p2 > 4.5 \quad (4)$$

where p2 is a form factor (the form factor p2 is defined by $p2=|(r2+r1)/(r2-r1)|$, where r1 is a radius of curvature of the plastic aspherical lens L12 on the object side lens surface on the optical axis, and r2 is a radius of curvature of the plastic aspherical lens L12 on the image side lens surface on the optical axis).

The conditional expression (4) specifies a form of the plastic lens L12 disposed in the first lens group G1. By satisfying the conditional expression (4), the refractive power of the plastic lens L12 is suppressed, and the generated aberrations can be corrected satisfactorily, and the influence of temperature change on the plastic aspherical lens L12 disposed in the first lens group G1 can be decreased. If the lower value of the conditional expression (4) is not reached, however, the refractive power of the plastic lens L12 increases, and when the refractive index of the plastic material fluctuates due to the temperature change, the change of back focus amount and the change of such aberrations as astigmatism due to this fluctuation cannot be ignored, which is not desirable.

To make the effect of the present embodiment certain, it is preferable to set the lower limit value of the conditional expression (4) to 5.3.

According to the present invention, it is preferable that the lenses constituting the third lens group G3 are plastic lenses. By using plastic lenses, attaching the aspherical surface by injection molding becomes easier, and the weight of the lens system becomes lighter.

According to the present embodiment, it is preferable that the lenses constituting the third lens group G3 are aspherical lenses. By this configuration, astigmatism and distortion can be corrected satisfactorily.

According to the present embodiment, it is preferable that the following conditional expression (5) is satisfied, $$\beta 3 < 0.85 \quad (5)$$

where β3 denotes a magnification of the third lens group G3 in the wide angle end state.

The conditional expression (5) is a conditional expression for suppressing the fluctuation of aberrations in the second lens group G2 upon zooming. If the upper limit value of the conditional expression (5) is exceeded, fluctuation of the aberrations such as astigmatism increases upon zooming, which is not desirable.

To make the effect of the present embodiment certain, it is preferable to set the upper limit value of the conditional expression (5) to 0.83.

According to the present embodiment, it is preferable that focusing is performed by moving the third lens group G3 in the optical axis direction. By moving the third lens group G3 comprised of plastic lenses which are lighter than glass lenses, the load applied to the drive mechanism when the third lens group G3 is moved upon zooming and focusing can be decreased. The load applied to the drive mechanism can be decreased even more if the third lens group G3 is comprised of one positive lens made of plastic.

According to the present embodiment, in order to correct axial chromatic aberration satisfactorily upon zooming with high magnification, it is preferable that the second lens group G2 has a positive lens disposed closest to the object, and satisfies the following conditional expression (6), $$53 < vd2 \quad (6)$$

where vd2 is an Abbe number of this positive lens.

To make the effect of the present embodiment certain, it is preferable to set the lower limit value of the conditional expression (6) to 55. To make the effect of the embodiment more certain, it is preferable to set the lower limit value of the conditional expression (6) to 57.

According to the present embodiment, it is preferable that the lens L11 having negative refractive power of the first lens group G1 is a spherical lens ("spherical" includes a plane). According to the present embodiment, it is preferable that the lens L11 having negative refractive power of the first lens group G1 is a glass lens.

By this configuration, a glass material having a high refractive index can be selected for the lens L11 having negative refractive power of the first lens group G1, disposed closest to the object, without increasing the cost very much, so the entire optical system can be compact, and have a configuration which excels in temperature characteristics.

Figure 11A:
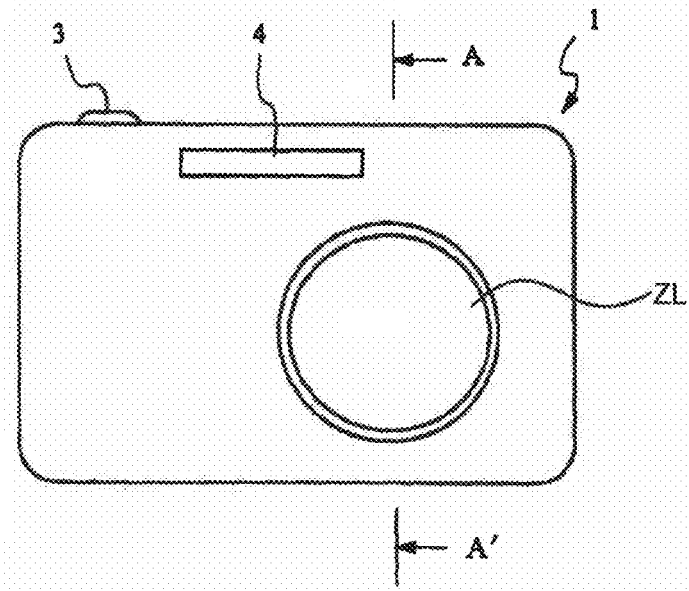
FIG. 11A is a front view and FIG. 11B is a rear view.
Figure 11B:
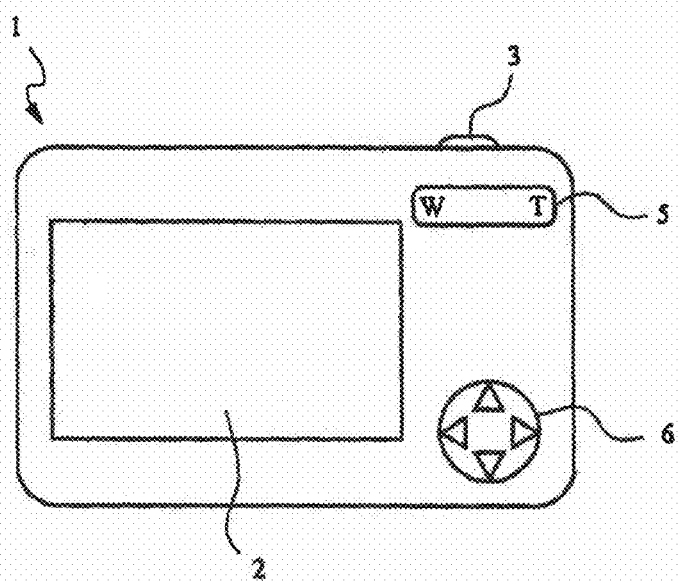
Figure 12:
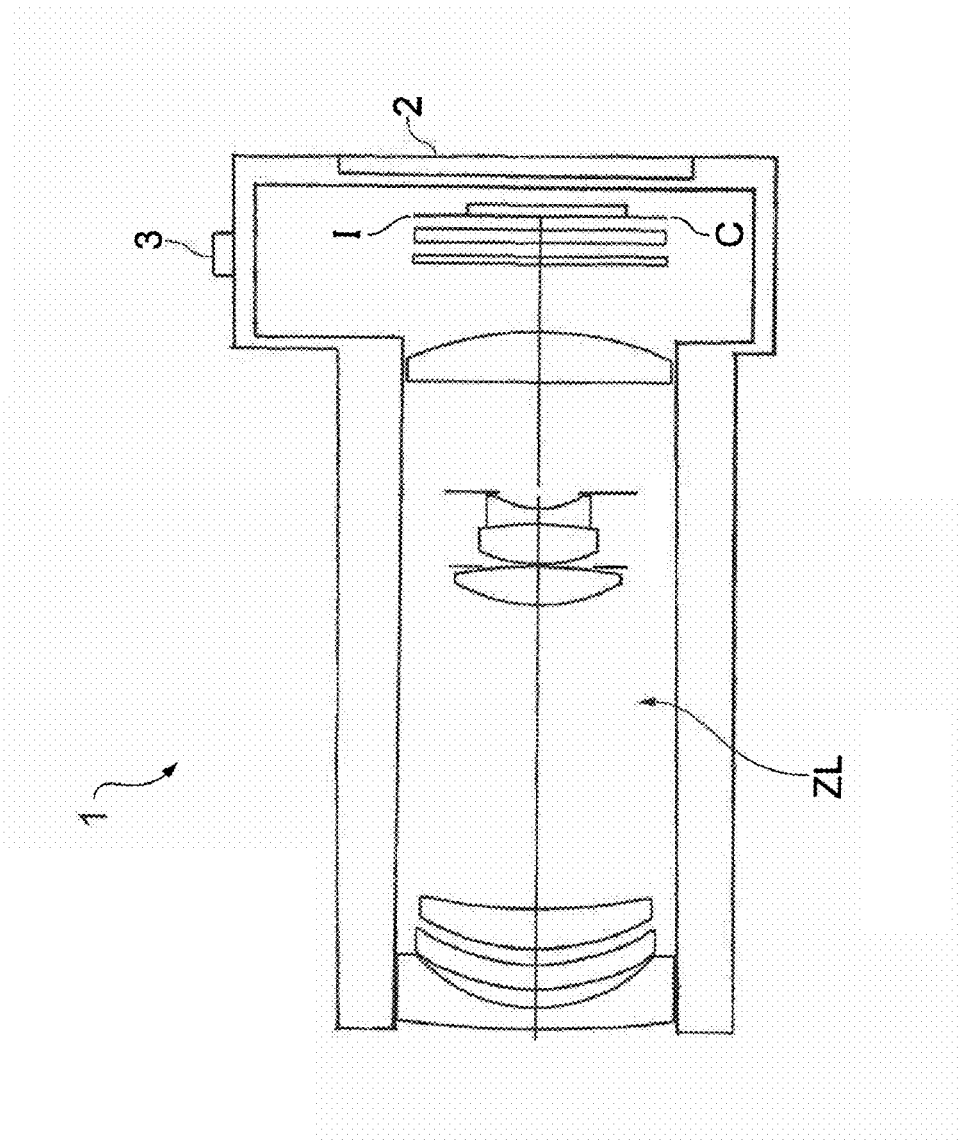
FIG. 12 is a cross-sectional view along the A-A' line in FIG. 11A.

FIG. 11 and FIG. 12 show a configuration of a digital still camera 1, as an optical apparatus having the lens system ZL constructed as above. In this digital still camera 1, a shutter, not illustrated, is released when a power button, not illustrated, is pressed, and lights from an object, not illustrated, are condensed in a lens system ZL, and form an image on an image sensing element C (e.g. film, CCD, CMOS) disposed on the image plane I. The object image formed on the image sensing element C is displayed on a liquid crystal monitor 2 disposed on the back of the camera 1. The user determines the composition of the object image while viewing the liquid crystal monitor 2 and pressing down on release button 3. Then the object image is captured by the image sensing element C, and recorded and saved in a memory, not illustrated.

In this digital still camera 1, an auxiliary light emission unit 4, which emits auxiliary light when the object is dark, a wide (W) tele (T) button 5 used upon zooming the lens system ZL from the wide angle end state (W) to the telephoto end state (T), and function button 6 used for setting various conditions of the digital still camera 1 are disposed.

EXAMPLES

Each example according to the present embodiment will now be described with reference to the drawings. Table 1 to Table 5 shown below are tables of each parameter in Example 1 to Example 5. In [Lens data], the surface number is a sequence of the lens surface viewed from an object along the light traveling direction, r is a radius of curvature of each lens surface, d is a surface distance, which is a distance from each optical surface to the next optical surface (or image plane) on the optical axis, nd is a refractive index with respect to the d-line (wavelength: 587.6 nm), and vd is an Abbe number based on the d-line. The fixed stop FS indicates a fixed aperture stop, and aperture stop S indicates an aperture stop. If the lens surface is aspherical, "*" is attached to the surface number, and the paraxial radius of curvature is shown in the portion of the radius of curvature r. "0.0000" in the radius of curvature indicates a plane or aperture. The refractive index of air "1.00000" is omitted.

In [Aspherical surface data], the form of the aspherical surface shown in [Lens data] is expressed by the following expression (a). In other words, the form of the aspherical surface is given by the following expression (a), where y denotes the height in a direction perpendicular to the optical axis, S (y) is a distance along the optical axis, from a tangential plane at the vertex of the aspherical surface to a position on the aspherical surface at the height y (Sag amount), r denotes a radius of curvature of the reference spherical surface (paraxial radius of curvature), K is a conical coefficient, and An is an aspherical coefficient of degree n. In each example, the aspherical coefficient A2 of degree 2 is 0, which is omitted in the data. En means $\times 10^n$. For example, $$1.234E - 05 = 1.234 \times 10^{-5}. \quad (a)$$

$$S(y) = (y^2/r) / \left\{ 1 + (1 - K \cdot y^2/r^2)^{1/2} \right\} +$$

$$A4 \times y^4 + A6 \times y^6 + A8 \times y^8 + A10 \times y^{10}$$

In [All parameters], f is a focal length of the lens system, Fno is an F number, and ω is a half angle of view. In [Variable distance data], f is a focal length of the lens system, Di (i is an integer) is a variable distance from the i-th surface to the next lens surface, and TL is a total lens length. [Group data] shows the first lens surface and the focal length of each group. In [Conditional expression], values corresponding to the conditional expressions (1) to (6) are shown.

In the table, the unit of the focal length f, radius of curvature r, surface distance d and other lengths are normally "mm". However, the unit is not limited to "mm", but other appropriate units may be used since an optical system can obtain an equivalent optical performance even if proportionally expanded or proportionally reduced.

This description on the table is the same for other example, for which description is omitted.

Example 1

Example 1 will now be described with reference to FIG. 1, FIG. 2 and Table 1. FIG. 1 shows a lens configuration and a zoom locus according to Example 1. As FIG. 1 shows, a lens system ZL1 according to Example 1 comprises, in order from an object, a first lens group G1 having negative refractive power, a second lens group G2 having positive refractive power, and a third lens group G3 having positive refractive power.

The first lens group G1 includes, in order from an object, a negative meniscus lens L11 having a convex surface facing the object, a negative meniscus shape plastic aspherical lens L12 having a convex surface facing the object, and a positive meniscus lens L13 having a convex surface facing the object. The second lens group G2 includes, in order from an object, a biconvex positive lens L21, an aperture stop S for adjusting light quantity, a cemented lens of a biconvex positive lens L22 and a biconcave negative lens L23, and a fixed aperture stop FS for cutting adverse lights. The third lens group G3 includes a biconvex plastic aspherical lens L3.

Between the third lens group G3 and an image plane I, a low pass filter LPF for cutting spatial frequencies exceeding the critical resolution of a solid image sensing element, such as CCD installed on the image plane I, and a cover glass G for protecting the image sensing portion of the CCD, are disposed.

In the lens system ZL1 according to Example 1 having the above mentioned configuration, the first lens group G1, and second lens group G2 move upon zooming from the wide angle end state to the telephone end state while the third lens group G3 is provided in fixation.

Table 1 is a table of each parameter according to Example 1. The surface numbers 1 to 19 in Table 1 correspond to the surfaces 1 to 19 in FIG. 1. In Example 1, the lens surfaces of the third, fourth, seventh and fifteenth surfaces are all formed to be aspherical. In the table, D6, D13 and D15 are variable distances.

TABLE 1

[Lens data]

| surface number | r | d | nd | vd |
|---|---|---|---|---|
| 1 | 43.4781 | 0.8000 | 1.88300 | 40.77 |
| 2 | 5.8920 | 0.7000 | | |
| *3 | 6.9391 | 0.9000 | 1.53270 | 56.19 |
| *4 | 6.2345 | 0.6000 | | |
| 5 | 8.3796 | 1.5000 | 1.84666 | 23.78 |
| 6 | 19.4985 | (D6) | | |
| *7 | 5.4768 | 1.4500 | 1.58913 | 61.15 |
| 8 | −17.0071 | 0.0000 | | |
| 9 | 0.0000 | 0.1000 | (aperture stop S) | |
| 10 | 5.1538 | 1.5000 | 1.72916 | 54.66 |
| 11 | −11.4771 | 0.6000 | 1.80100 | 34.96 |
| 12 | 2.9867 | 0.6000 | | |
| 13 | 0.0000 | (D13) | (fixed stop FS) | |
| 14 | 1076.3973 | 1.9000 | 1.53270 | 56.19 |
| *15 | −11.8411 | (D15) | | |
| 16 | 0.0000 | 0.3000 | 1.54437 | 70.51 |
| 17 | 0.0000 | 0.5000 | | |
| 18 | 0.0000 | 0.5000 | 1.51633 | 64.14 |
| 19 | 0.0000 | 0.5000 | | |

[Aspherical data]

third surface

K = 1.1464, A4 = −1.6852E−03, A6 = 5.5302E−05, A8 = −2.1988E−06, A10 = 1.2434E−07 fourth surface

K = 0.7841, A4 = −2.0296E−03, A6 = 7.4233E−05, A8 = −3.7909E−06, A10 = 1.7078E−07 seventh surface

K = −0.0034, A4 = −4.5242E−05, A6 = 0.0000E+00, A8 = 0.0000E+00, A10 = 0.0000E+00 fifteenth surface

K = 1.0000, A4 = 2.2672E−06, A6 = −2.2914E−07, A8 = 0.0000E+00, A10 = 0.0000E+00

TABLE 1-continued

[All parameters]

| | wide angel end | | intermediate focal length | | telephoto end |
|---|---|---|---|---|---|
| f | 6.87 | ~ | 12.66 | ~ | 23.33 |
| Fno | 3.23 | ~ | 4.54 | ~ | 6.96 |
| ω | 32.24 | | ~ | | 10.02 |

[Variable distance data]

| variable distance | wide angle end | intermediate focal length | telephoto end |
|---|---|---|---|
| f | 6.87 | 12.66 | 23.33 |
| D6 | 11.47 | 0.60 | 4.42 |
| D13 | 4.18 | 17.77 | 8.97 |
| D15 | 2.54 | 2.54 | 2.54 |
| TL | 30.65 | 28.38 | 33.37 |

[Group data]

| group No. | first surface of group | focal length of group |
|---|---|---|
| G1 | 1 | −13.90 |
| G2 | 7 | 9.35 |
| G3 | 14 | 22.00 |

[Conditional expression]

| conditional expression (1) | \|fp/f1\| = 14.9 |
| conditional expression (2) | f1/ft = −0.589 |
| conditional expression (3) | f2/ft = 0.4 |
| conditional expression (4) | p2 = 18.70 |
| conditional expression (5) | β3 = 0.815 |
| conditional expression (6) | vd2 = 61.2 |

As the table of parameters in Table 1 shows, the lens system ZL1 according to Example 1 satisfies all the conditional expressions (1) to (6).

FIG. 2 are graphs showing various aberrations (spherical aberration, astigmatism, distortion, lateral chromatic aberration and coma aberration) of Example 1, where (a) are graphs showing various aberrations upon focusing on infinity in the wide angle end state, (b) are graphs showing various aberrations upon focusing on infinity in the intermediate focal length state, and (c) are graphs showing various aberrations upon focusing on infinity in the telephoto end state. In each graph showing aberrations, FNO is the F number, and Y is the image height. In a graph showing spherical aberration, a value of F number corresponding to a maximum aperture is shown, in a graph showing astigmatism and a graph showing distortion, a maximum value of the image height is shown respectively, and in a graph showing coma aberration, the value of each image height is shown. d shows various aberrations with respect to the d-line (wavelength: 587.6 nm), and g shows various aberrations with respect to the g-line (wavelength: 435.8 nm), and no indication shows various aberrations with respect to the d-line. In the graph showing astigmatism, the solid line shows a sagittal image surface, and the broken line shows a meridional image surface. The graph showing coma aberration is based on a half angle of view. This description on the graphs showing aberrations is the same for other examples, therefore the description thereof is omitted.

As seen in each graph showing aberrations, various aberrations are corrected satisfactorily in each focal length state, from the wide angle end state to the telephoto end state, and excellent image performance is implemented in Example 1.

Example 2

Example 2 will now be described with reference to FIG. 3, FIG. 4 and Table 2. FIG. 3 shows a lens configuration and a zoom locus according to Example 2. As FIG. 3 shows, a lens system ZL2 according to Example 2 comprises, in order from an object, a first lens group G1 having negative refractive power, a second lens group G2 having positive refractive power, and a third lens group G3 having positive refractive power.

The first lens group G1 includes, in order from an object, a negative meniscus lens L11 having a convex surface facing the object, a negative meniscus shape plastic aspherical lens L12 having a convex surface facing the object, and a positive meniscus lens L13 having a convex surface facing the object. The second lens group G2 includes, in order from an object, an aperture stop S for adjusting light quantity, a biconvex positive lens L21, a cemented lens of a biconvex positive lens L22 and a biconcave negative lens L23, and a fixed aperture stop FS for cutting adverse lights. The third lens group G3 includes a biconvex plastic aspherical lens L3.

Between the third lens group G3 and an image plane I, a low pass filter LPF for cutting spatial frequencies exceeding the critical resolution of a solid image sensing element, such as CCD installed on the image plane I, and a cover glass G for protecting the image sensing portion of the CCD, are disposed.

In the lens system ZL2 according to Example 2 having the above mentioned configuration, the first lens group G1 and second lens group G2 move upon zooming from the wide angle end state to the telephone end state while the third lens group G3 is provided in fixation.

Table 2 is a table of each parameter according to Example 2. The surface numbers 1 to 19 in Table 2 correspond to the surfaces 1 to 19 in FIG. 3. In Example 2, the lens surfaces of the third, fourth, seventh and fifteenth surfaces are all formed to be aspherical. In the table, D6, D13 and D15 are variable distances.

TABLE 2

[Lens data]

| surface number | r | d | nd | vd |
|---|---|---|---|---|
| 1 | 72.9434 | 0.8000 | 1.88300 | 40.77 |
| 2 | 6.6482 | 0.5000 | | |
| *3 | 5.8331 | 0.9000 | 1.53270 | 56.19 |
| *4 | 4.8234 | 0.9000 | | |
| 5 | 7.7902 | 1.6000 | 1.84666 | 23.78 |
| 6 | 16.9589 | (D6) | | |
| *7 | 5.5513 | 1.7000 | 1.58913 | 61.15 |
| 8 | −16.6397 | 0.0000 | | |
| 9 | 0.0000 | 0.1000 | (aperture stop S) | |
| 10 | 5.2531 | 1.5000 | 1.72916 | 54.66 |
| 11 | −9.5540 | 0.6000 | 1.80100 | 34.96 |
| 12 | 3.0640 | 0.6000 | | |
| 13 | 0.0000 | (D13) | (fixed stop FS) | |
| 14 | −55.4517 | 1.9000 | 1.53270 | 56.19 |
| *15 | −10.1544 | (D15) | | |
| 16 | 0.0000 | 0.3000 | 1.54437 | 70.51 |
| 17 | 0.0000 | 0.4000 | | |
| 18 | 0.0000 | 0.5000 | 1.51633 | 64.14 |
| 19 | 0.0000 | 0.6000 | | |

[Aspherical data]

third surface

K = 1.027, A4 = −1.7695E−03, A6 = 6.4228E−05, A8 = −2.1934E−06, A10 = 7.5262E−08

TABLE 2-continued fourth surface

K = 0.824, A4 = −2.2442E−03, A6 = 8.9619E−05, A8 = −4.7187E−06,
A10 = 1.5759E−07
seventh surface K = 0.283, A4 = −2.6502E−04, A6 = 0.0000E+00, A8 = 0.0000E+00,
A10 = 0.0000E+00
fifteenth surface

K = 1.000, A4 = 6.8115E−05, A6 = −1.4586E−07, A8 = 0.0000E+00,
A10 = 0.0000E+00

[All parameters]

|  | wide angel end | | intermediate focal length | | telephoto end |
| --- | --- | --- | --- | --- | --- |
| f | 6.87 | ~ | 13.34 | ~ | 25.90 |
| Fno | 2.90 | ~ | 4.29 | ~ | 7.00 |
| ω | 32.24 | | ~ | | 9.08 |

[Variable distance data]

| variable distance | wide angle end | intermediate focal length | telephoto end |
| --- | --- | --- | --- |
| f | 6.87 | 13.44 | 25.90 |
| D6 | 11.38 | 4.21 | 0.50 |
| D13 | 3.33 | 9.28 | 19.88 |
| D15 | 3.30 | 2.75 | 1.79 |
| TL | 30.91 | 29.14 | 35.07 |

[Group data]

| group No. | first surface of group | focal length of group |
| --- | --- | --- |
| G1 | 1 | −13.90 |
| G2 | 7 | 9.40 |
| G3 | 14 | 23.00 |

[Conditional expression]

| conditional expression (1) | |fp/f1| = 5.5 |
| --- | --- |
| conditional expression (2) | f1/ft = −0.53 |
| conditional expression (3) | f2/ft = 0.363 |
| conditional expression (4) | p2 = 10.55 |
| conditional expression (5) | β3 = 0.802 |
| conditional expression (6) | vd2 = 61.2 |

As the table of parameters in Table 2 shows, the lens system ZL2 according to Example 2 satisfies all the conditional expressions (1) to (6).

Figure 4A:
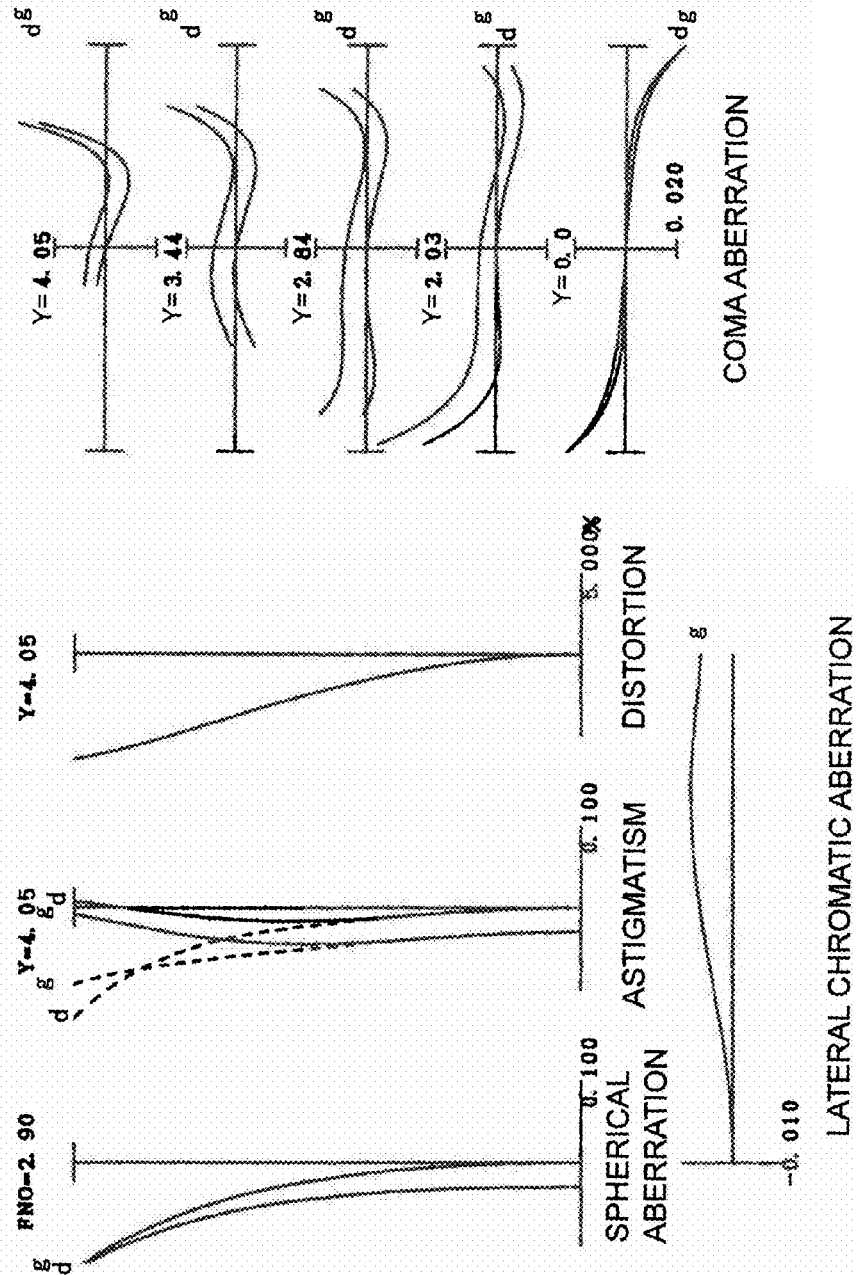
FIG. 4 are graphs showing various aberrations of the lens system according to Example 2, where FIG. 4A are graphs showing various aberrations upon focusing on infinity in the wide angle end state, FIG. 4B are graphs showing various aberrations upon focusing on infinity in the intermediate focal length state, and FIG. 4C are graphs showing various aberrations upon focusing on infinity in the telephone end state.

FIG. 4 are graphs showing various aberrations (spherical aberration, astigmatism, distortion, lateral chromatic aberration and coma aberration) of Example 2, where (a) are graphs showing various aberrations upon focusing on infinity in the wide angle end state, (b) are graphs showing various aberrations upon focusing on infinity in the intermediate focal length state, and (c) are graphs showing various aberrations upon focusing on infinity in the telephone end state. As seen in each graph showing an aberration, various aberrations are corrected satisfactorily in each focal length state, from the wide angle end state to the telephoto end state, and excellent image performance is implemented in Example 2.

Example 3

Example 3 will now be described with reference to FIG. 5, FIG. 6 and Table 3. FIG. 5 shows a lens configuration and a zoom locus according to Example 3. As FIG. 5 shows, a lens system ZL3 according to Example 3 comprises, in order from an object, a first lens group G1 having negative refractive power, a second lens group G2 having positive refractive power, and a third lens group G3 having positive refractive power.

The first lens group G1 includes, in order from an object, a negative meniscus lens L11 having a convex surface facing the object, a negative meniscus shape plastic aspherical lens L12 having a convex surface facing the object, and a positive meniscus lens L13 having a convex surface facing the object. The second lens group G2 includes, in order from an object, a biconvex positive lens 121, an aperture stop S for adjusting light quantity, a cemented lens of a biconvex positive lens L22 and a biconcave negative lens L23, and a fixed aperture stop FS for cutting adverse lights. The third lens group G3 includes a biconvex plastic lens L3.

Between the third lens group G3 and an image plane I, a low pass filter LPF for cutting spatial frequencies exceeding the critical resolution of a solid image sensing element, such as CCD installed on the image plane I, and a cover glass G for protecting the image sensing portion of the CCD, are disposed.

In the lens system ZL3 according to Example 3 having the above mentioned configuration, the first lens group G1, second lens group G2 and third lens group G3 move upon zooming from the wide angle end state to the telephone end state.

Table 3 is a table of each parameter according to Example 3. The surface numbers 1 to 19 in Table 3 correspond to the surfaces 1 to 19 in FIG. 5. In Example 3, the lens surfaces of the third, fourth and eighth surfaces are all formed to be aspherical. In the table, D6, D13 and D15 are variable distances.

TABLE 3

[Lens data]

| surface number | r | d | nd | vd |
| --- | --- | --- | --- | --- |
| 1 | 131.3535 | 0.8000 | 1.88300 | 40.77 |
| 2 | 6.1516 | 0.6000 | | |
| *3 | 6.7606 | 0.9000 | 1.53270 | 56.19 |
| *4 | 5.3199 | 0.8000 | | |
| 5 | 7.3702 | 1.5000 | 1.84666 | 23.78 |
| 6 | 14.3403 | (D6) | | |
| 7 | 0.0000 | 0.0000 | (aperture stop S) | |
| *8 | 5.7938 | 1.4500 | 1.61881 | 63.86 |
| 9 | −17.9645 | 0.1000 | | |
| 10 | 5.1719 | 1.5000 | 1.72916 | 54.66 |
| 11 | −11.9568 | 0.6000 | 1.80100 | 34.96 |
| 12 | 3.0442 | 0.6000 | | |
| 13 | 0.0000 | (D13) | (fixed stop FS) | |
| 14 | 37.1974 | 2.1000 | 1.53270 | 56.19 |
| 15 | −13.6242 | (D15) | | |
| 16 | 0.0000 | 0.3000 | 1.54437 | 70.51 |
| 17 | 0.0000 | 0.5000 | | |

TABLE 3-continued

| 18 | 0.0000 | 0.5000 | 1.51633 | 64.14 |
| 19 | 0.0000 | 0.5000 | | |

[Aspherical data]

third surface

K = 1.108, A4 = −1.7561E−03, A6 = 6.2478E−05, A8 = −2.1362E−06, A10 = 9.3330E−08 fourth surface

K = 0.817, A4 = −2.1817E−03, A6 = 9.2739E−05, A8 = −4.8123E−06, A10 = 1.8472E−07 eighth surface

K = −0.001, A4 = −5.0738E−05, A6 = 0.0000E+00, A8 = 0.0000E+00, A10 = 0.0000E+00

[All parameters]

| | wide angel end | | intermediate focal length | | telephoto end |
|---|---|---|---|---|---|
| f | 6.87 | ~ | 12.66 | ~ | 23.33 |
| Fno | 3.29 | ~ | 4.58 | ~ | 6.98 |
| ω | 32.24 | | ~ | | 9.08 |

[Variable distance data]

| variable distance | wide angle end | intermediate focal length | telephoto end |
|---|---|---|---|
| f | 6.87 | 12.66 | 23.33 |
| D6 | 12.93 | 4.83 | 0.65 |
| D13 | 4.38 | 10.40 | 21.30 |
| D15 | 2.72 | 2.33 | 1.62 |
| TL | 30.28 | 28.34 | 33.60 |

[Group data]

| group No. | first surface of group | focal length of group |
|---|---|---|
| G1 | 1 | −13.90 |
| G2 | 7 | 9.25 |
| G3 | 14 | 18.99 |

[Conditional expression]

| conditional expression (1) | |fp/f1| = 5.23 |
| conditional expression (2) | f1/ft = −0.5877 |
| conditional expression (3) | f2/ft = 0.388 |
| conditional expression (4) | p2 = 8.39 |
| conditional expression (5) | β3 = 0.784 |
| conditional expression (6) | vd2 = 63.9 |

As the table of parameters in Table 3 shows, the lens system ZL3 according to Example 3 satisfies all the conditional expressions (1) to (6).

Figure 6A:
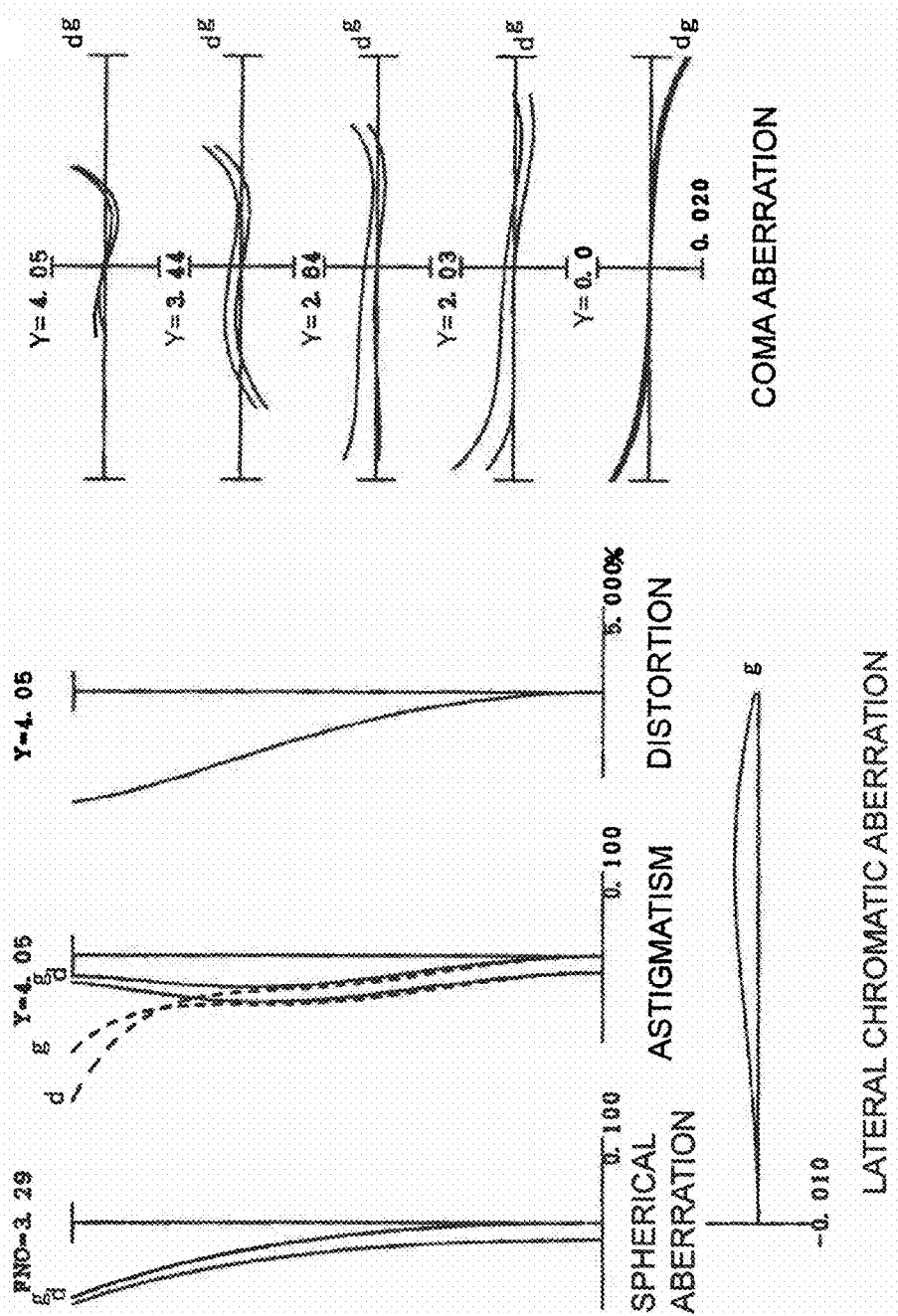
FIG. 6 are graphs showing various aberrations of the lens system according to Example 3, where FIG. 6A are graphs showing various aberrations upon focusing on infinity in the wide angle end state, FIG. 6B are graphs showing various aberrations upon focusing on infinity in the intermediate focal length state, and FIG. 6C are graphs showing various aberrations upon focusing on infinity in the telephone end state.
Figure 6B:
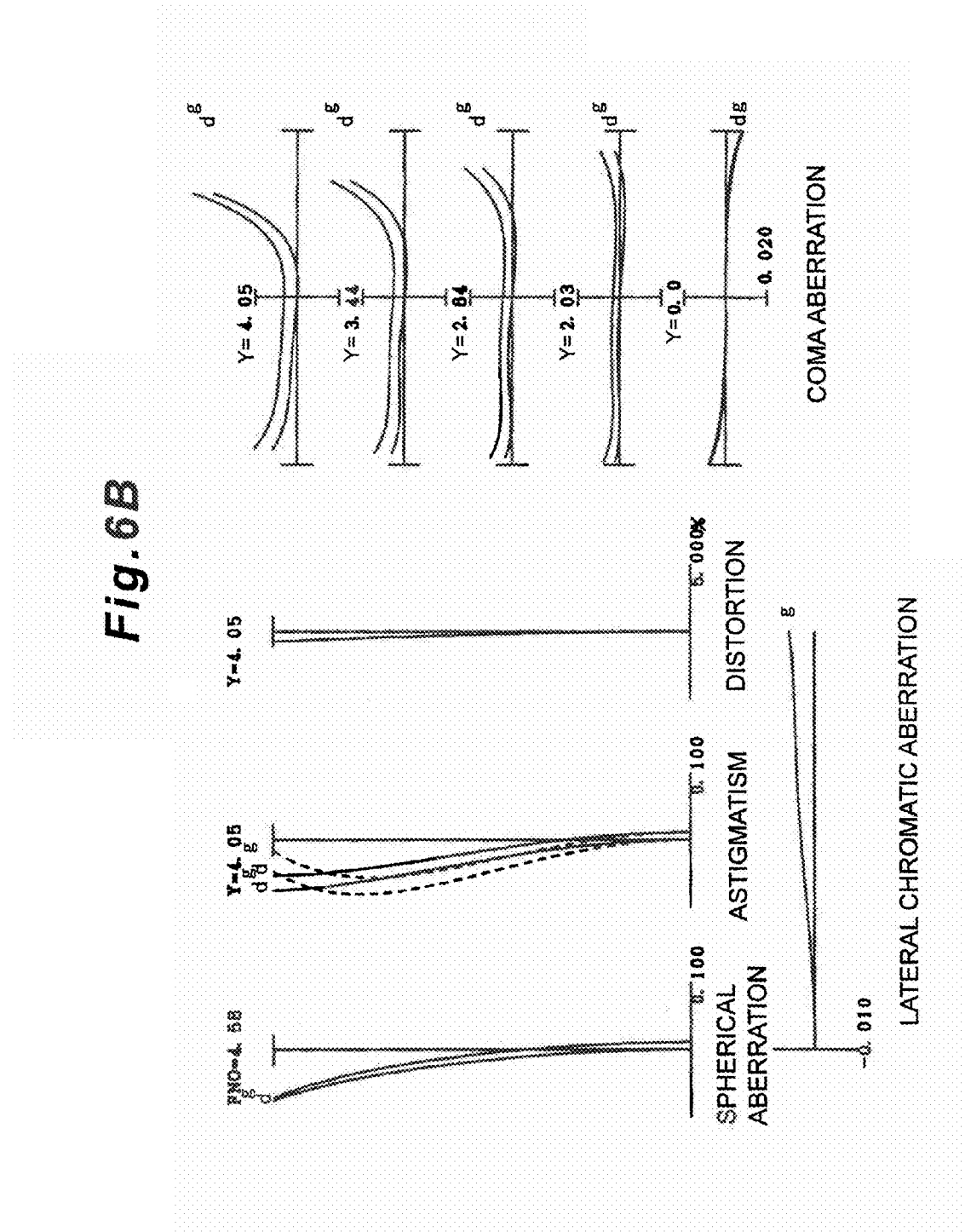

FIG. 6 are graphs showing various aberrations (spherical aberration, astigmatism, distortion, lateral chromatic aberration and coma aberration) of Example 3, where (a) are graphs showing various aberrations upon focusing on infinity in the wide angle end state, (b) are graphs showing various aberrations upon focusing on infinity in the intermediate focal length state, and (c) are graphs showing various aberrations upon focusing on infinity in the telephone end state. As seen in each graph showing an aberration, various aberrations are corrected satisfactorily in each focal length state, from the wide angle end state to the telephoto end state, and excellent image performance is implemented in Example 3.

Example 4

Example 4 will now be described with reference to FIG. 7, FIG. 8 and Table 4. FIG. 7 shows a lens configuration and a zoom locus according to Example 4. As FIG. 7 shows, a lens system ZL4 according to Example 4 comprises, in order from an object, a first lens group G1 having negative refractive power, a second lens group G2 having positive refractive power, and a third lens group G3 having positive refractive power.

The first lens group G1 includes, in order from an object, a negative meniscus lens L11 having a convex surface facing the object, a negative meniscus shape plastic aspherical lens L12 having a convex surface facing the object, and a positive meniscus lens L13 having a convex surface facing the object. The second lens group G2 includes, in order from an object, an aperture stop S for adjusting light quantity, a biconvex positive lens L21, a cemented lens of a biconvex positive lens L22 and a biconcave negative lens L23, and a fixed aperture stop FS for cutting adverse lights. The third lens group G3 includes a biconvex plastic lens L3.

Between the third lens group G3 and an image plane I, a low pass filter LPF for cutting spatial frequencies exceeding the critical resolution of a solid image sensing element, such as CCD installed on the image plane I, and a cover glass G for protecting the image sensing portion of the CCD, are disposed.

In the lens system ZL4 according to Example 4 having the above mentioned configuration, the first lens group G1, second lens group G2 and third lens group G3 move upon zooming from the wide angle end state to the telephone end state.

Table 4 is a table of each parameter according to Example 4. The surface numbers 1 to 19 in Table 4 correspond to the surfaces 1 to 19 in FIG. 70. In Example 4, the lens surfaces of the third, fourth and eighth surfaces are all formed to be aspherical. In the table, D6, D13 and D15 are variable distances.

TABLE 4

[Lens data]

| surface number | r | d | nd | vd |
|---|---|---|---|---|
| 1 | 78.8098 | 0.8000 | 1.88300 | 40.77 |
| 2 | 6.3574 | 0.7000 | | |
| *3 | 7.8612 | 0.9000 | 1.53270 | 56.19 |
| *4 | 7.1139 | 0.7000 | | |
| 5 | 9.2797 | 1.6000 | 1.84666 | 23.78 |
| 6 | 25.4891 | (D6) | | |
| 7 | 0.0000 | 0.0000 | (aperture stop S) | |
| *8 | 5.6968 | 1.7000 | 1.58313 | 59.38 |
| 9 | −15.8471 | 0.1000 | | |
| 10 | 6.1788 | 1.7000 | 1.77250 | 49.61 |
| 11 | −13.6690 | 0.6000 | 1.85026 | 32.35 |
| 12 | 3.3628 | 0.6000 | | |
| 13 | 0.0000 | (D13) | (fixed stop FS) | |
| 14 | 46.2953 | 1.9000 | 1.53270 | 56.19 |
| 15 | −14.5407 | (D15) | | |
| 16 | 0.0000 | 0.3000 | 1.54437 | 70.51 |
| 17 | 0.0000 | 0.4000 | | |
| 18 | 0.0000 | 0.5000 | 1.51633 | 64.14 |
| 19 | 0.0000 | 0.6000 | | |

[Aspherical data]

third surface

K = 1.337, A4 = −1.0427E−03, A6 = 4.0949E−05, A8 = −1.2169E−06, A10 = 9.3754E−08 fourth surface

K = 0.731, A4 = −1.3117E−03, A6 = 6.6830E−05, A8 = −3.6150E−06, A10 = 1.7574E−07 eighth surface

TABLE 4-continued

K = 0.123, A4 = −2.4656E−04, A6 = 0.0000E+00, A8 = 0.0000E+00,
A10 = 0.0000E+00

[All parameters]

| | wide angel end | | intermediate focal length | | telephoto end |
|---|---|---|---|---|---|
| f | 6.87 | ~ | 13.34 | ~ | 25.90 |
| Fno | 3.01 | ~ | 4.36 | ~ | 6.97 |
| ω | 32.24 | | ~ | | 9.00 |

[Variable distance data]

| variable distance | wide angle end | intermediate focal length | telephoto end |
|---|---|---|---|
| f | 6.87 | 13.34 | 25.90 |
| D6 | 12.93 | 4.83 | 0.65 |
| D13 | 4.38 | 10.40 | 21.30 |
| D15 | 2.72 | 2.33 | 1.62 |
| TL | 33.13 | 30.66 | 36.66 |

[Group data]

| group No. | first surface of group | focal length of group |
|---|---|---|
| G1 | 1 | −14.80 |
| G2 | 7 | 10.15 |
| G3 | 14 | 21.00 |

[Conditional expression]

| conditional expression (1) | |fp/f1| = 12.4 |
|---|---|
| conditional expression (2) | f1/ft = −0.571 |
| conditional expression (3) | f2/ft = 0.392 |
| conditional expression (4) | p2 = 20.04 |
| conditional expression (5) | β3 = 0.784 |
| conditional expression (6) | vd2 = 59.4 |

As the table of parameters in Table 4 shows, the lens system ZL4 according to Example 4 satisfies all the conditional expressions (1) to (6).

Figure 8C:
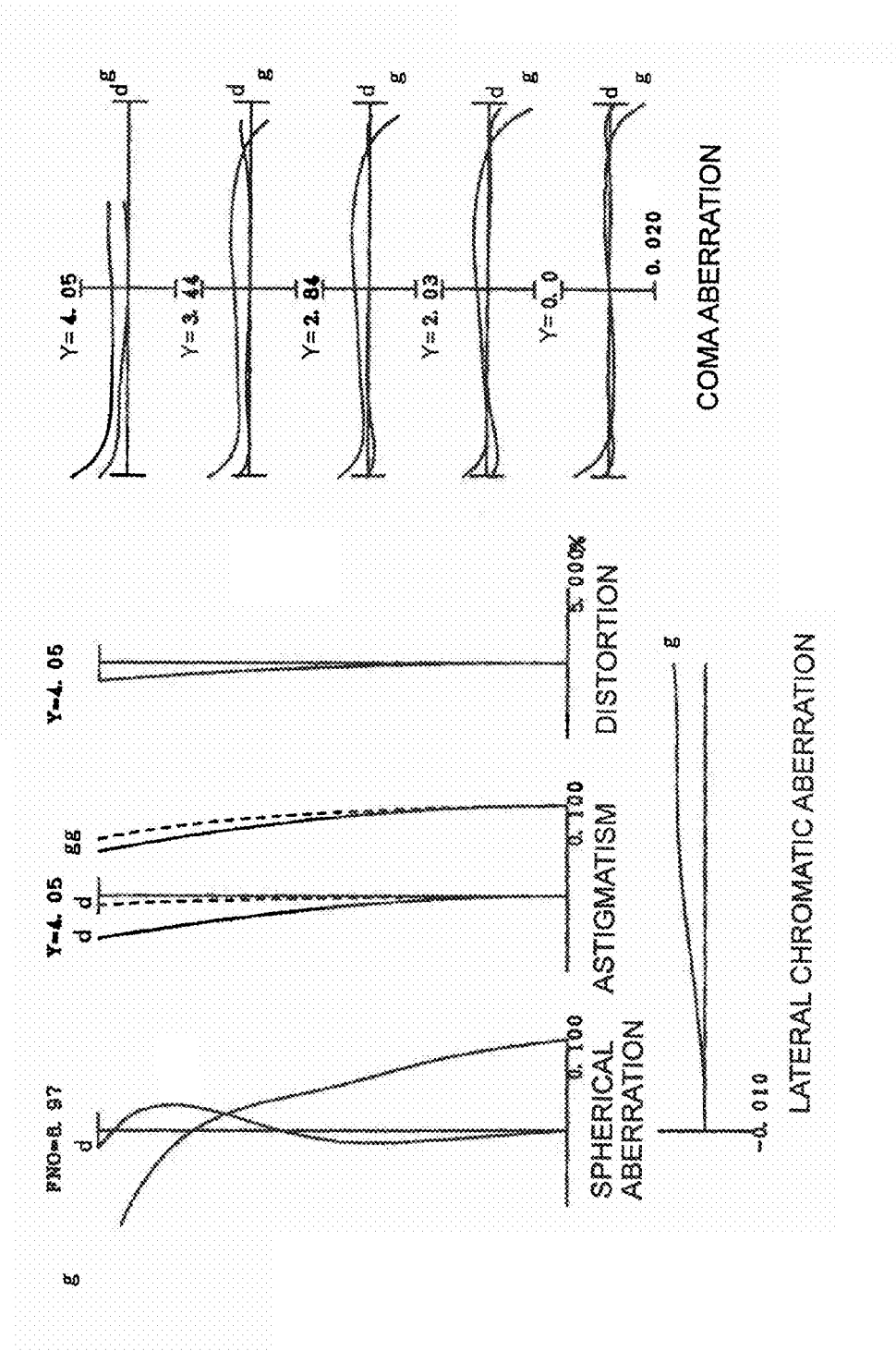
FIG. 8 are graphs showing various aberrations of the lens system according to Example 4, where FIG. 8A are graphs showing various aberrations upon focusing on infinity in the wide angle end state, and FIG. 8B are graphs showing various aberrations upon focusing on infinity in the intermediate focal length state, and FIG. 8C are graphs showing various aberrations upon focusing on infinity in the telephone end state.

FIG. 8 are graphs showing various aberrations (spherical aberration, astigmatism, distortion, lateral chromatic aberration and coma aberration) of Example 4, where (a) are graphs showing various aberrations upon focusing on infinity in the wide angle end state, (b) are graphs showing various aberrations upon focusing on infinity in the intermediate focal length state, and (c) are graphs showing various aberrations upon focusing on infinity in the telephone end state. As seen in each graph showing an aberration, various aberrations are corrected satisfactorily in each focal length state, from the wide angle end state to the telephoto end state, and excellent image performance is implemented in Example 4.

Example 5

Example 5 will now be described with reference to FIG. 9, FIG. 10 and Table 5. FIG. 9 shows a lens configuration and a zoom locus according to Example 5. As FIG. 9 shows, a lens system ZL5 according to Example 5 comprises, in order from an object, a first lens group G1 having negative refractive power, a second lens group G2 having positive refractive power, and a third lens group G3 having positive refractive power.

The first lens group G1 includes, in order from an object, a negative meniscus lens L11 having a convex surface facing the object, a negative meniscus shape plastic aspherical lens L12 having a convex surface facing the object, and a positive meniscus lens L13 having a convex surface facing the object. The second lens group G2 includes, in order from an object, an aperture stop S for adjusting light quantity, a positive meniscus lens L21 having a convex surface facing the object, a negative meniscus lens L22 having a convex surface facing the object, a negative meniscus lens L23 having a convex surface facing the object, and a fixed aperture stop FS for cutting adverse lights.

Between the second lens group G2 and an image plane I, a low pass filter LPF for cutting spatial frequencies exceeding the critical resolution of a solid image sensing element, such as CCD installed on the image plane I, and a cover glass G for protecting the image sensing portion of the CCD, are disposed.

In the lens system ZL5 according to Example 5 having the above mentioned configuration, the first lens group G1 and second lens group G2 move upon zooming from the wide angle end state to the telephone end state.

Table 5 is a table of each parameter according to Example 5. The surface numbers 1 to 18 in Table 5 correspond to the surfaces 1 to 18 in FIG. 9. In Example 5, the lens surfaces of the third, fourth, eighth, twelfth and thirteenth surfaces are all formed to be aspherical. In the table, D6 and D14 are variable distances.

TABLE 5

[Lens data]

| surface number | r | d | nd | vd |
|---|---|---|---|---|
| 1 | 11.9370 | 0.8000 | 1.88300 | 40.77 |
| 2 | 4.2601 | 1.5000 | | |
| *3 | 10.0797 | 0.9000 | 1.53270 | 56.19 |
| *4 | 7.1095 | 0.1000 | | |
| 5 | 9.3175 | 1.2000 | 1.84666 | 23.78 |
| 6 | 25.0945 | (D6) | | |
| 7 | 0.0000 | 0.0000 | (aperture stop S) | |
| *8 | 3.9026 | 1.5000 | 1.61881 | 63.86 |
| 9 | 11.3941 | 0.1000 | | |
| 10 | 4.9789 | 0.8000 | 1.84666 | 23.78 |
| 11 | 2.9348 | 0.5000 | | |
| *12 | 5.4380 | 1.0000 | 1.61881 | 63.86 |
| *13 | 27.8932 | 1.0000 | | |
| 14 | 0.0000 | (D14) | (fixed stop FS) | |
| 15 | 0.0000 | 0.3000 | 1.54437 | 70.51 |
| 16 | 0.0000 | 0.5000 | | |
| 17 | 0.0000 | 0.5000 | 1.51633 | 64.14 |
| 18 | 0.0000 | 0.6028 | | |

[Aspherical data]

third surface

K = 1.000, A4 = −2.8198E−03, A6 = 3.3626E−05, A8 = 5.8706E−06,
A10 = −3.3310E−07 fourth surface

K = −4.260, A4 = −2.2552E−03, A6 = −9.0449E−06, A8 = 6.5209E−06,
A10 = −4.6984-0 eighth surface

K = 0.736, A4 = −1.9950E−04, A6 = 0.0000E+00, A8 = 0.0000E+00,
A10 = 0.0000E+00 twelfth surface

K = 1.000, A4 = 2.4448E−03, A6 = 0.0000E+00, A8 = 0.0000E+00,
A10 = 0.0000E+00

TABLE 5-continued thirteenth surface

K = 1.000, A4 = 3.1238E−03, A6 = 0.0000E+00, A8 = 0.0000E+00,
A10 = 0.0000E+00

[All parameters]

|  | wide angel end | | intermediate focal length | | telephoto end |
| --- | --- | --- | --- | --- | --- |
| f | 6.87 | ~ | 11.60 | ~ | 22.00 |
| Fno | 3.60 | ~ | 4.61 | ~ | 6.91 |
| ω | 32.23 | | ~ | | 10.43 |

[Variable distance data]

| variable distance | wide angle end | intermediate focal length | telephoto end |
| --- | --- | --- | --- |
| f | 6.87 | 11.60 | 22.00 |
| D6 | 10.75 | 4.11 | 0.40 |
| D14 | 8.44 | 12.68 | 20.28 |
| TL | 30.49 | 28.05 | 31.97 |

[Group data]

| group No. | first surface of group | focal length of group |
| --- | --- | --- |
| G1 | 1 | −11.50 |
| G2 | 7 | 9.00 |

[Conditional expression]

| | |
| --- | --- |
| conditional expression (1) | \|fp/f1\| = 4.4 |
| conditional expression (2) | f1/ft = −0.523 |
| conditional expression (3) | f2/ft = 0.409 |
| conditional expression (4) | p2 = 5.79 |
| conditional expression (6) | vd2 = 63.9 |

As the table of parameters in Table 5 shows, the lens system ZL5 according to Example 5 satisfies all the conditional expressions (1) to (4) and (6).

Figure 10B:
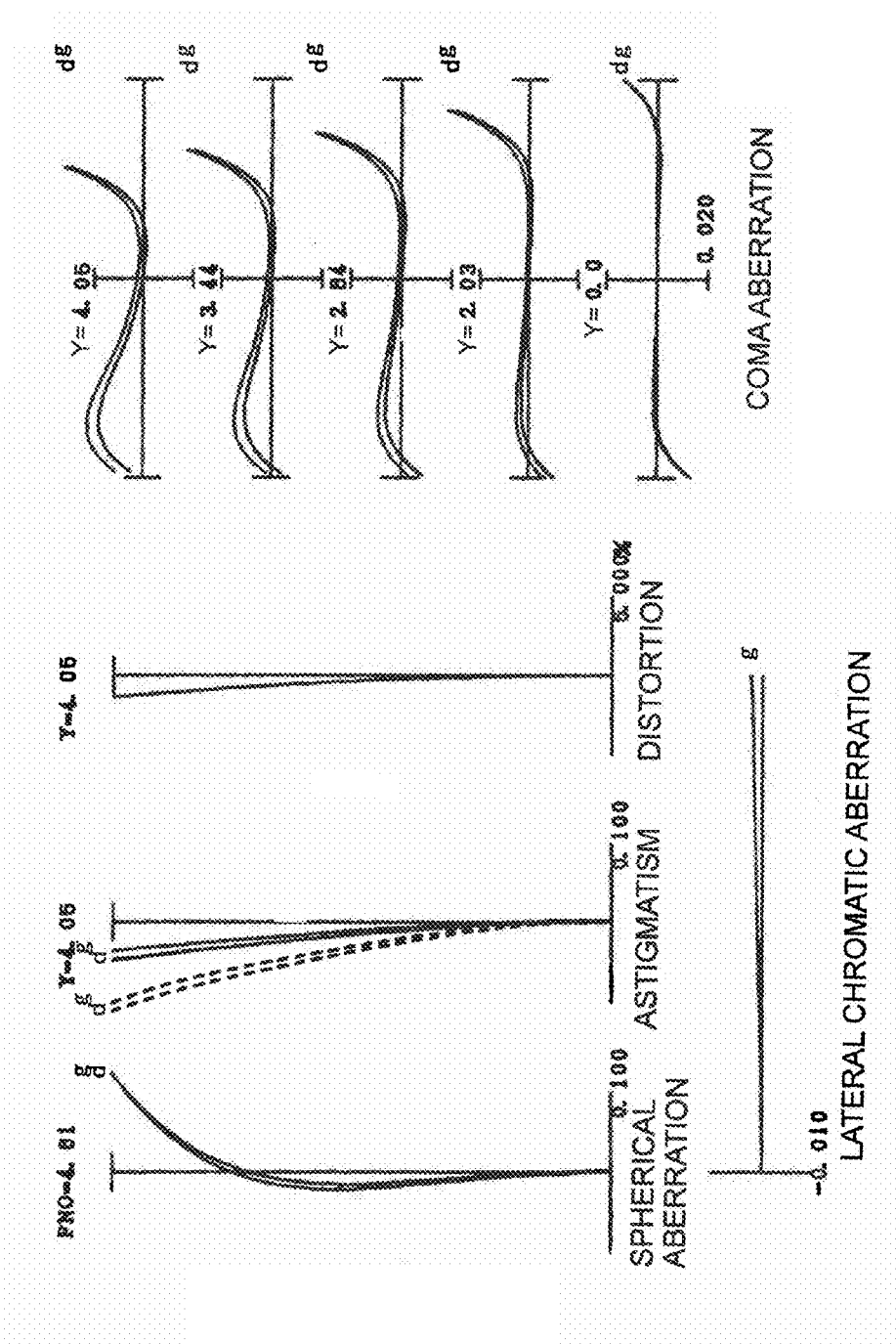
FIG. 10 are graphs showing various aberrations of the lens system according to Example 5, where FIG. 10A are graphs showing various aberrations upon focusing on infinity in the wide angle end state, FIG. 10B are graphs showing various aberrations upon focusing on infinity in the intermediate focal length state, and FIG. 10C are graphs showing various aberrations upon focusing on infinity in the telephone end state.
Figure 10C:
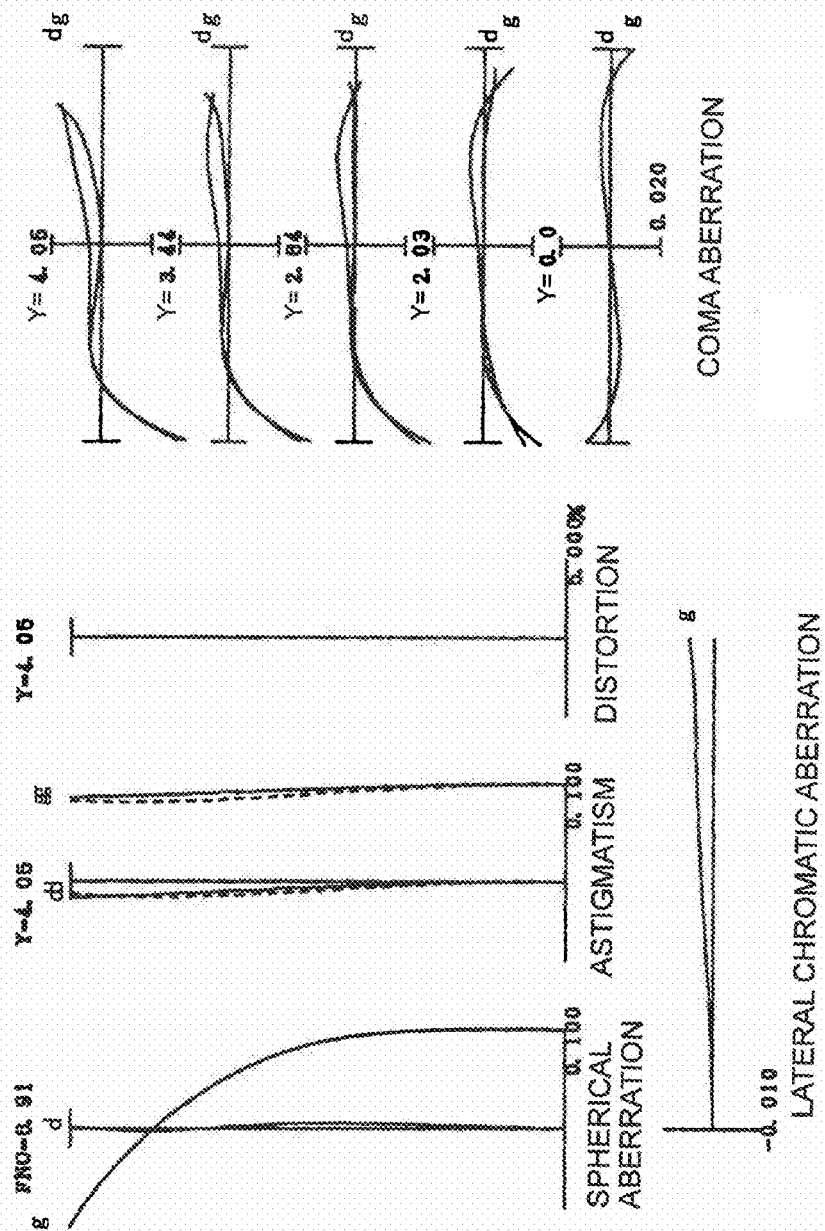

FIG. 10 are graphs showing various aberrations (spherical aberration, astigmatism, distortion, lateral chromatic aberration and coma aberration) of Example 5, where (a) are graphs showing various aberrations upon focusing on infinity in the wide angle end state, (b) are graphs showing various aberrations upon focusing on infinity in the intermediate focal length state, and (c) are graphs showing various aberrations upon focusing on infinity in the telephone end state. As seen in each graph showing an aberration, various aberrations are corrected satisfactorily in each focal length state, from the wide angle end state to the telephoto end state, and excellent image performance is implemented in Example 5.

Now an overview of a manufacturing method for a lens system comprising, in order from an object, a first lens group G1 having negative refractive power and a second lens group G2 having a positive refractive power will be described with reference to FIG. 13.

First a lens L11 having negative refractive power, a plastic aspherical lens L12 and a lens L13 having positive refractive power, which comprise the first lens group G1, are disposed, sequentially from the object, in a cylindrical lens barrel, so that the conditional expression $|fp/f1|>4.0$ (where fp denotes a focal length of the plastic aspherical lens, and f1 denotes a focal length of the first lens group) is satisfied, and [the entire lens system] has negative refractive power (step S1), then a first positive lens L21, a second positive lens L22 and a negative lens L23 constituting the second lens group G2 are disposed therein, so that [the entire lens system] has positive refractive power (step S2).

In the above embodiment, the following content can be used if necessary, within a scope where the optical performance is not diminished.

In the above example, a two-group or three-group configuration was shown as the lens system ZL, but [the present invention] can also be used in other group configurations, such as a four-group configuration.

A single or a plurality of lens group(s) or a part of a lens group may be a focusing lens group which moves in the optical axis direction to perform focusing from an object to infinity to an object at close distance. The focusing lens group can also be used in auto focus, and is also appropriate for driving a motor for auto focus (e.g. ultrasonic motor). It is particularly preferable that the first lens group G1 or the third lens group G3 is the focusing lens group.

A lens group or a part of a lens group may be a vibration proof lens group, which vibrates in a direction perpendicular to the optical axis to correct an image blur generated by hand motion. It is particularly preferable that at least a part of the second lens group G2 or the third lens group G3 is the vibration proof lens group.

Each lens surface may be aspherical. Any of an aspherical surface by grinding, glass mold aspherical surface created by forming a glass, and aspherical shape using a mold, and a composite aspherical surface created by forming resin on the surface of glass to be an aspherical shape, may be used.

It is preferable that the aperture stop S is disposed near the second lens group G2, but a lens frame may substitute that role, without disposing the aperture stop as a separate element. It is particularly preferable that the aperture stop S is disposed closer to the object than the lens surface closest to the objet in the second lens group G2.

An anti-reflection film having a high transmittance in a wide wavelength range may be formed on each lens surface so as to decrease flares and ghosts, and implement high optical performance with high contrast.

The configuration requirements of the present embodiment was described to assist in understanding the present invention, but needless to say, the present invention is not limited to this.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens system comprising, in order from an object:
a first lens group having negative refractive power, and a second lens group having positive refractive power,
the first lens group including, in order from the object, a lens having negative refractive power, a plastic aspherical lens and a lens having positive refractive power, and the following conditional expression being satisfied:

$7.0 < |fp/f1| \leq 12.4$ where fp denotes a focal length of the plastic aspherical lens, and f1 denotes a focal length of the first lens group, and
wherein the plastic aspherical lens of the first lens group satisfies the following conditional expression:

$p2 > 4.5$ where p2 denotes a form factor (the form factor p2 is defined, by $p2 = |(r2+r1)/(r2-r1)|$, where r1 denotes a radius of curvature of the plastic aspherical lens on an object side lens surface on an optical axis, and r2 denotes a radius of curvature of the plastic aspherical lens on an image side lens surface on the optical axis.

2. The lens system according to claim 1, wherein the following conditional expression is satisfied:

$$-0.65 < f1/ft < -0.50$$

where f1 denotes a focal length of the first lens group, and ft denotes a focal length of the lens system in a telephoto end state.

3. The lens system according to claim 1, wherein the following conditional expression is satisfied:

$$f2/ft < 0.45$$

where f2 denotes a focal length of the second lens group, and ft denotes a focal length of the lens system in a telephoto end state.

4. The lens system according to claim 1, wherein the plastic aspherical lens of the first lens group is a double aspherical lens.

5. The lens system according to claim 1, wherein the second lens group has a positive lens disposed closest to the object, and satisfies the following conditional expression:

$$vd2 > 53$$

where vd2 denotes an Abbe number of the positive lens.

6. The lens system according to claim 1, wherein the lens having negative refractive power of the first lens group is a spherical lens.

7. The lens system according to claim 1, wherein the lens having negative refractive power of the first lens group is a glass lens.

8. The lens system according to claim 1, wherein an aperture stop is disposed between the first lens group and the second lens group.

9. The lens system according to claim 1, wherein the second lens group comprises, in order from the object, a first positive lens having positive refractive power, a second positive lens having positive refractive power, and a negative lens having negative refractive power.

10. The lens system according to claim 1, wherein a third lens group having positive refractive power is disposed at an image side of the second lens group.

11. The lens system according to claim 10, wherein the lenses constituting the third lens group are plastic lenses.

12. The lens system according to claim 10, wherein the lenses constituting the third lens group are aspherical lenses.

13. The lens system according to claim 10, wherein the following conditional expression is satisfied:

$$\beta 3 < 0.85$$

where $\beta 3$ denotes a magnification of the third lens group in a wide angle end state.

14. The lens system according to claim 10, wherein focusing is performed by moving the third lens group in an optical axis direction.

15. The lens system according to claim 10, wherein the first lens group, the second lens group and the third lens group move in an optical axis direction, upon zooming.

16. The lens system according to claim 10, wherein the first lens group and the second lens group move in an optical axis direction, and the third lens group is fixed, upon zooming.

17. An optical apparatus having the lens system according to claim 1.

18. A manufacturing method for a lens system including, in order from an object, a first lens group having negative refractive power and a second lens group having positive refractive power, the method comprising a step of disposing, in order from the object, a lens having negative refractive power, a plastic aspherical lens, and a lens having positive refractive power, for the first lens group, so that the following conditional expression is satisfied:

$$7.0 < |fp/f1| \leq 12.4$$

where fp denotes a focal length of the plastic aspherical lens, and f1 denotes a focal length of the first lens group, and wherein the plastic aspherical lens of the first lens group satisfies the following conditional expression:

$$p2 > 4.5$$

where p2 denotes a form factor (the form factor p2 is defined by $p2 = |(r2+r1)/(r2-r1)|$, where r1 denotes a radius of curvature of the plastic aspherical lens on an object side lens surface on an optical axis, and r2 denotes a radius of curvature of the plastic aspherical lens on an image side lens surface on the optical axis).

19. The manufacturing method for the lens system according to claim 18, wherein the following conditional expression is satisfied:

$$-0.65 < f1/ft < -0.50$$

where f1 denotes a focal length of the first lens group, and ft denotes a focal length of the lens system in a telephoto end state.

20. The manufacturing method for the lens system according to claim 18, wherein the following conditional expression is satisfied:

$$f2/ft < 0.45$$

where f2 denotes a focal length of the second lens group, and ft denotes a focal length of the lens system in a telephoto end state.

21. The manufacturing method for the lens system according to claim 18, wherein the plastic aspherical lens of the first lens group is a double aspherical lens.

22. A lens system comprising, in order from an object:

a first lens group having negative refractive power, and a second lens group having positive refractive power, the first lens group including, in order from the object, a lens having negative refractive power, a plastic aspherical lens and a lens having positive refractive power, and the following conditional expression being satisfied:

$$|fp/f1| > 4.0$$

where fp denotes a focal length of the plastic aspherical lens, and f1 denotes a focal length of the first lens group, and wherein the plastic aspherical lens of the first lens group satisfies the following conditional expression:

$$4.5 < p2 \leq 8.39$$

where p2 denotes a form factor (the form factor p2 is defined by $p2 = |(r2+r1)/(r2-r1)|$, where r1 denotes a radius of curvature of the plastic aspherical lens on an object side lens surface on an optical axis, and r2 denotes a radius of curvature of the plastic aspherical lens on an image side lens surface on the optical axis).

23. A manufacturing method for a lens system including, in order from an object, a first lens group having negative refractive power and a second lens group having positive refractive power, the method comprising a step of disposing, in order from the object, a lens having negative refractive power, a plastic aspherical lens, and a lens having positive refractive power, for the first lens group, so that the following conditional expression is satisfied:

$|fp/f1|>4.0$ where fp denotes a focal length of the plastic aspherical lens, and f1 denotes a focal length of the first lens group, and wherein the plastic aspherical lens of the first lens group satisfies the following conditional expression:

$4.5<p2\geq 8.39$ where p2 denotes a form factor (the form factor p2 is defined by $p2=|(r2+r1)/(r2-r1)|$, where r1 denotes a radius of curvature of the plastic aspherical lens on an object side lens surface on an optical axis, and r2 denotes a radius of curvature of the plastic aspherical lens on an image side lens surface on the optical axis).

24. A lens system comprising, in order from an object:
a first lens group having negative refractive power, and a second lens group having positive refractive power,
the first lens group including, in order from the object, a lens having negative refractive power, a plastic aspherical lens and a lens having positive refractive power, and the following conditional expression being satisfied:

$|fp/f1|>4.0$ where fp denotes a focal length of the plastic aspherical lens, and f1 denotes a focal length of the first lens group, and wherein the plastic aspherical lens of the first lens group satisfies the following conditional expression:

$p2>4.5$ where p2 denotes a form factor (the form factor p2 is defined by $p2=|(r2+r1)/(r2-r1)|$, where r1 denotes a radius of curvature of the plastic aspherical lens on an object side lens surface on an optical axis, and r2 denotes a radius of curvature of the plastic aspherical lens on an image side lens surface on the optical axis), wherein a third lens group having positive refractive power is disposed at an image side of the second lens group, and wherein the first lens group and the second lens group move in an optical axis direction, and the third lens group is fixed, upon zooming.

25. A manufacturing method for a lens system including, in order from an object, a first lens group having negative refractive power, and a second lens group having positive refractive power, the method comprising a step of disposing, in order from the object, a lens having negative refractive power, a plastic aspherical lens and a lens having positive refractive power, for the first lens group, so that the following conditional expression is satisfied:

$|fp/f1|>4.0$ where fp denotes a focal length of the plastic aspherical lens, and f1 denotes a focal length of the first lens group, wherein the plastic aspherical lens of the first lens group satisfies the following conditional expression:

$p2>4.5$ where p2 denotes a form factor (the form factor p2 is defined by $p2=|(r2+r1)/(r2-r1)|$, where r1 denotes a radius of curvature of the plastic aspherical lens on an object side lens surface on an optical axis, and r2 denotes a radius of curvature of the plastic aspherical lens on an image side lens surface on the optical axis), wherein a third lens group having positive refractive power is disposed at an image side of the second lens group, and wherein the first lens group and the second lens group move in an optical axis direction, and the third lens group is fixed, upon zooming.

* * * * *